United States Patent
Smart et al.

(10) Patent No.: US 11,454,569 B2
(45) Date of Patent: Sep. 27, 2022

(54) ENGINE HEALTH DIAGNOSTIC APPARATUS AND METHOD

(71) Applicant: STS INTELLIMON LIMITED, Stratford upon Avon (GB)

(72) Inventors: Edward Smart, Portsmouth (GB); Neil Grice, Wareham (GB); David Brown, Portsmouth (GB); Martin Gregory, Wareham (GB); David Garrity, Gosport (GB)

(73) Assignee: STS INTELLIMON LIMITED, Stratford upon Avon (GB)

( * ) Notice: Subject to any disclaimer, the term of this patent is extended or adjusted under 35 U.S.C. 154(b) by 234 days.

(21) Appl. No.: 16/463,861

(22) PCT Filed: Nov. 20, 2017

(86) PCT No.: PCT/GB2017/053477
§ 371 (c)(1),
(2) Date: May 24, 2019

(87) PCT Pub. No.: WO2018/100334
PCT Pub. Date: Jun. 7, 2018

(65) Prior Publication Data
US 2019/0383705 A1    Dec. 19, 2019

(30) Foreign Application Priority Data
Nov. 29, 2016 (EP) .................................... 16201222

(51) Int. Cl.
*G01M 15/12* (2006.01)
*G05B 23/02* (2006.01)
*G01M 15/04* (2006.01)

(52) U.S. Cl.
CPC ......... *G01M 15/12* (2013.01); *G05B 23/0254* (2013.01); *G01M 15/04* (2013.01)

(58) Field of Classification Search
CPC ...... G01M 15/00; G01M 15/04; G01M 15/12; G05B 23/0254; G06K 9/00536
See application file for complete search history.

(56) References Cited

U.S. PATENT DOCUMENTS

| 6,574,613 B1 * | 6/2003 | Moreno-Barragan ....................... G05B 19/406 706/2 |
| 2002/0040278 A1 * | 4/2002 | Anuzis ............... G01N 29/4481 702/56 |

(Continued)

FOREIGN PATENT DOCUMENTS

| CN | 103020438 A | 4/2013 |
| CN | 103454113 A | 12/2013 |

(Continued)

OTHER PUBLICATIONS

Office Action for CN Application No. 201780072359.1 dated Sep. 21, 2020 and English translation, 21 pages.

(Continued)

*Primary Examiner* — Arleen M Vazquez
*Assistant Examiner* — Terence E Stifter, Jr.
(74) *Attorney, Agent, or Firm* — Nixon & Vanderhye PC

(57) ABSTRACT

An engine health diagnostic apparatus is provided for analysing health of a reciprocating internal combustion engine. The apparatus comprises feature generation circuitry for processing vibration sensor data received from a vibration sensor detecting vibration at a component of the reciprocating internal combustion engine 4 and generating a feature vector indicating multiple features of the sensor data. Processing circuitry processes the feature vector using a trained classification model which is defined by model parameters characterising a decision boundary of healthy operation learnt from a training set of feature vectors captured during healthy operation of the engine. The model generates an (Continued)

engine health indication providing a quantitative indication of deviation of the feature vector from the decision boundary of healthy operation.

19 Claims, 11 Drawing Sheets

(56) References Cited

U.S. PATENT DOCUMENTS

| | | | | |
|---|---|---|---|---|
| 2006/0210141 A1* | 9/2006 | Kojitani | ............... | G06K 9/6269 382/141 |
| 2007/0088550 A1* | 4/2007 | Filev | ................. | G05B 23/0283 704/245 |
| 2010/0023307 A1* | 1/2010 | Lee | ..................... | G06K 9/6226 703/7 |
| 2013/0060524 A1* | 3/2013 | Liao | .................. | G05B 23/0254 702/182 |
| 2016/0055737 A1* | 2/2016 | Boken | ................. | G08B 21/187 340/679 |
| 2016/0298537 A1 | 10/2016 | Matthews et al. | | |
| 2017/0315516 A1* | 11/2017 | Kozionov | .............. | G01H 1/003 |
| 2019/0391038 A1* | 12/2019 | Kitai | ....................... | G01M 7/02 |

FOREIGN PATENT DOCUMENTS

| | | |
|---|---|---|
| CN | 106150716 A | 11/2016 |
| EP | 3 073 116 | 9/2016 |
| WO | 2016/089238 | 6/2016 |

OTHER PUBLICATIONS

B. Schölkopf, et al., "Support Vector Method for Novelty Detection", MIT Press, 2000, pp. 582-588.

B. Schölkopf, et al., "Estimating the Support of a High-Dimensional Distribution", Neural Computation, (2001), vol. 13, Jul. 2001, pp. 1443-1471.

International Search Report and Written Opinion of the ISA for PCT/GB2017/053477 dated Feb. 20, 2018, 15 pages.

* cited by examiner

ENGINE HEALTH DIAGNOSTIC APPARATUS AND METHOD

This application is the U.S. national phase of International Application No. PCT/GB2017/053477 filed Nov. 20, 2017 which designated the U.S. and claims priority to EP Application No. 16201222.3 filed Nov. 29, 2016, the entire contents of each of which are hereby incorporated by reference.

The present technique relates to the field of reciprocating internal combustion engines. More particularly, it relates to an engine health diagnostic apparatus and method for analysing the health of a reciprocating internal combustion engine.

Reciprocating internal combustion engines are typically used as the main propulsion system for maritime vessels. The breakdown of propulsion systems at sea can be very costly for shipping owners and operators. Failures of parts requiring invasive repair, such as the replacement of a piston can cost in the range of hundreds of thousands of dollars, while spectacular failures such as the engine fire caused by a crankcase split on the "Carnival Splendor" cost an estimated $65,000,000 in repair costs, losses and compensation. In addition, the early onset of common faults, such as worn piston rings, can lead to phenomena such as blow-by, where the air/fuel mixture can escape past the edges of the piston and into the crankcase, reducing the efficiency of combustion and causing an increase in fuel consumption and emissions. Early detection and rectification of defects before they become catastrophic therefore has a twofold benefit to maritime end users, not only preventing catastrophic failure but also saving fuel and increasing efficiency during periods when the failure is not yet critical. Similar problems exist for other applications of reciprocating internal combustion engines, such as for power generation, so the problem is not only confined to the maritime sector.

At least some examples provide an engine health diagnostic apparatus for analysing health of a reciprocating internal combustion engine, the apparatus comprising:

feature generation circuitry to process vibration sensor data received from a vibration sensor for sensing vibration at a component of said reciprocating internal combustion engine and generate a feature vector indicating a plurality of features of the vibration sensor data; and processing circuitry to process the feature vector generated by the feature generation circuitry using a trained classification model defined by model parameters characterising a boundary of healthy operation learnt from a training set of feature vectors corresponding to vibration sensor data captured during healthy operation of the reciprocating internal combustion engine, to generate an engine health indication providing a quantitative indication of deviation of the feature vector from the boundary of healthy operation.

At least some examples provide a system comprising:
a reciprocating internal combustion engine;
a vibration sensor configured to sense vibration at a corresponding component of the reciprocating internal combustion engine; and
the engine health diagnostic apparatus as described above.

At least some examples provide an engine health diagnostic method for analysing health of a reciprocating internal combustion engine, the method comprising:

capturing vibration sensor data using a vibration sensor fitted to sense vibration at a component of said reciprocating internal combustion engine;

processing the vibration sensor data to generate a feature vector indicating a plurality of features of the vibration sensor data; and processing the feature vector using a trained classification model defined by model parameters characterising a boundary of healthy operation learnt from a training set of feature vectors corresponding to vibration sensor data captured during healthy operation of the reciprocating internal combustion engine, to generate an engine health indication providing a quantitative indication of deviation of the feature vector from the boundary of healthy operation.

At least some examples provide an engine health diagnostic system installation method comprising:

fitting a vibration sensor to a component of a reciprocating internal combustion engine to sense vibration at said component of said reciprocating internal combustion engine;

capturing vibration sensor data using the vibration sensor during a period of healthy operation of the reciprocating internal combustion engine;

processing the vibration sensor data to generate a training set of feature vectors, each feature vector indicating a plurality of features of the vibration sensor data captured at a given time during the period of healthy operation;

training a classification model to generate model parameters characterising a boundary of healthy operation learnt from the training set of feature vectors; and recording the model parameters defining the classification model.

At least some examples provide a computer program comprising instructions to control a data processing apparatus to perform either of the methods described above. The computer program may be stored on a storage medium. The storage medium may be a non-transitory storage medium.

Further aspects, features and advantages of the present technique will be apparent from the following description of examples, which is to be read in conjunction with the accompanying drawings, in which:

FIG. 1 schematically illustrates an overview of a system for engine health monitoring;

FIG. 2 schematically illustrates the system architecture in more detail;

Figure 1:
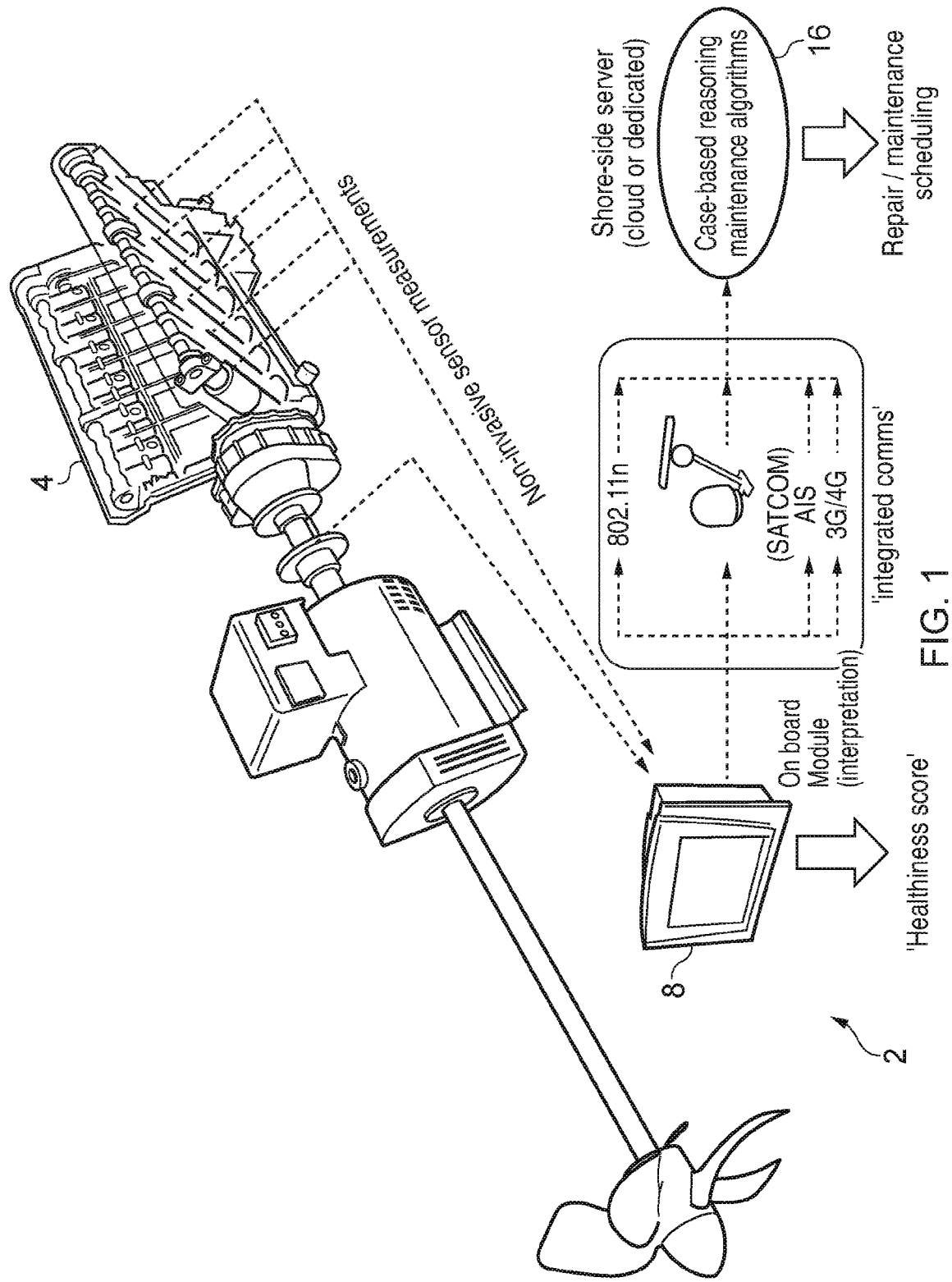

The present technique provides an engine health diagnostic apparatus for analysing health of a reciprocating internal combustion engine, based on vibration sensor data received from a vibration sensor for sensing vibration at a component of the engine. Feature generation circuitry processes the vibration sensor data and generates a feature vector which indicates multiple features of the vibration sensor data. Processing circuitry processes the feature vector using a trained classification model to generate an engine health indication. The trained classification model is defined by model parameters which characterise a boundary of healthy operation learnt from a training set of feature vectors which correspond to vibration sensor data captured during healthy operation of the engine, and the health indication provides a quantitative indication of deviation of the feature vector from the boundary of healthy operation learnt during the training.

This approach has several technical advantages. Unlike alternative approaches which attempt to characterise particular failure modes of the engine and match data sensed from the engine during operation against the pre-learnt characteristics of those failure modes, the present technique trains the model using feature vectors corresponding to vibration sensor data captured during healthy operation of the engine and then generates an engine health indication which quantifies the deviation of a newly captured feature vector from the boundary of healthy operation learnt from those training set of feature vectors. Hence, the model does not attempt to characterise any particular mode of failure. While it may seem counterintuitive to detect engine failures without any knowledge of any particular type of failure, the approach of training using healthy data does provide several advantages.

Firstly, this approach allows the diagnostic apparatus to be retrofitted to a range of different models of engine or in different installations of the same engine model, which may each exhibit different characteristic vibration patterns for nominally the same failure mode. Learning a bespoke pattern of failure characteristics for each type of engine to which the device is fitted can be challenging since in practice engines do not fail often and even among multiple instances of nominally the same model of engine the vibrations detected may still differ and so learning from a failure on one engine of a given model may not necessarily allow detection of the same failure in another engine of the same model, due to differences in installation etc. While there is typically relatively little data available on faulty engines available for training a model, there will typically be a large body of training data available corresponding to healthy operation, since the model can be trained by simply monitoring the engine during normal operation when no particular fault has yet been identified. Hence in practice the approach of detecting failures based on deviation from the healthy behaviour (rather than by classification of faulty patterns) allows the system to be more widely applicable to a range of different models or installations of engine.

Also, by quantifying the deviation of the feature vector from the previously learnt boundary of healthy operation, this provides not only a binary indication of whether the engine is healthy or faulty, but also allows the degree of healthiness in the engine to be evaluated even when no particular fault is yet apparent. For example, an engine in near-perfect health may have a different score from an engine which is generally healthy but has been deteriorating and so would become faulty in future if nothing is done, or which is running inefficiently due to a blow by phenomenon for example. By quantifying the degree of healthiness of the engine, rather than simply detecting failures, this can allow potential problems to be detected earlier so that appropriate repair or maintenance operations can be scheduled in time to prevent failures which may be more catastrophic at a later date. A quantitative engine health indication can also be useful for evaluating whether the engine is still healthy enough to avoid performing unnecessary precautionary repair operations purely as a measure for reducing the likelihood of failure when actually the engine is healthy enough that that failure is not likely. For example, a particular shipping operator may currently schedule routine maintenance to replace a certain component while a ship is in port, merely because on average that component tends to last a certain length of time before deteriorating, but in fact for a particular engine that component may not be as worn as expected and could have lasted longer. The diagnostic apparatus of the present technique can provide a quantitative indication of the health of the engine, which can indicate that actually the engine has not deviated significantly from the healthy operation observed earlier, and so the precautionary repair can be cancelled, saving cost.

The technique also enables potential faults with the engine to be identified earlier than can be identified by a skilled engineer on site. Some skilled engineers may be able to identify some faults simply from listening to the vibrations of the engine, but the ability to pinpoint faults in this way may require many years of experience. Therefore, employing such a skilled engineer may be costly and many shipping vessels or generator installations may not have such a skilled engineer on site. The quantitative indication of engine health provided by the present technique can be sent back to a remote site or communicated to less skilled operators at the site of the engine in order to flag issues which may have arisen. In any case, even if a skilled engineer is present, some types of fault may not be apparent to the engineer until they have developed into a sufficiently serious fault that the vibration change is noticeable to the ear. In contrast, the engine health diagnostic apparatus can detect potential faults earlier by detecting deviation of the captured feature vector from the boundary of healthy operation learnt previously.

The feature vector generated by the feature generation circuitry may include a number of different features of the monitored vibration sensor data. For example, the features may include at least one time domain feature of the vibration sensor data. For example the time domain feature could be at least one of the following statistical parameters evaluated for vibration sensor readings captured over a given period of time: mean; variance or standard deviation; root mean square; kurtosis; skewness; and crest factor. It will be appreciated that other statistics could also be derived from time domain sensor data. Including time domain features in the feature vector can help reduce the false positive fault detection rate of the model by enabling temporary changes in behaviour due to external factors to be distinguished from longer lasting problems with the engine.

The feature vector can also include at least one frequency domain feature of the vibration sensor data. For example a certain frequency transform can be applied to the vibration sensor data captured in a given time period in order to compute frequency domain features. A variety of different frequency transforms could be used, including for example a Fourier transform. However, it can be particularly useful to apply a Wavelet Packet Transform (WPT) to the vibration sensor data to generate the frequency domain features. The WPT can be used to decompose the time domain series of vibration sensor data into separate frequency bands, with each frequency component represented by a wavelet of finite duration rather than a continuous sine or cosine wave as in a Fourier transform). While the WPT is relatively computationally intensive in comparison to Fourier transforms, it has the benefit that it can detect features of interest despite engine speed changes due to the complexity of the wavelets, which makes WPTs better suited than Fourier transforms which are more useful for constant speed samples. Changes in engine speed are likely in some applications such as shipping where the demand for power output from the propulsion engine will change over time. Hence, using the WPT helps to make the model more robust against changes in engine load.

Various features can be derived from the frequency domain data. For example statistical parameters such as mean, standard deviation, etc. could be derived in a similar way to the time domain data discussed above. However, in one example the frequency domain features may comprise frequency band energy features each indicative of an energy in a corresponding frequency band of the vibration sensitive data. An engine fault may result in a change in which frequency bands have the highest energy of vibration, so including frequency band energy features in the feature vector increases the ability of the classification model to identify departure from healthy behaviour.

Also, the feature vector may include at least one peak vibration timing feature which indicates a timing of a peak in the vibrations sensor data relative to an operating cycle of the engine. For example, a crankshaft angle sensor may be provided for sensing an angular position of a crank shaft of the engine, and the data from the crank shaft angle sensor can be used to identify the peak vibration timing feature. Considering timings of peaks in the vibrations relative to an operating cycle of the engine can help to identify types of faults which would be difficult to detect from the time and frequency domain data alone. For example, this can be used to identify faults such as loose engine mounts or worn piston rings. Some faults may be caused not by excessive amounts of vibration, but by the late timing of a cylinder of the engine firing for example, and so the consideration of a peak vibration timing feature can help to identify that kind of fault.

In summary, the feature vector may provide a range of different features of the detected vibration sensor data which can be used as input to the classification model. In particular, the feature vector may combine features from two or more of the classes discussed above (time domain feature, frequency domain feature, and peak vibration timing feature), which gives better model performance than if only one of these classes of feature was provided.

In some examples the generated feature vector could simply be input in its original form to the classification model which can then process it to determine the calculated health indication. However, in other examples scaling circuitry may be provided to scale each feature of the feature vector based on a respective set of scaling parameters derived from the training set of feature vectors, in order to map each feature of the feature vector onto a common scale of reference. For example, the scaling may normalise each feature to lie within fixed bounds such as between 0 and 1.

The processing circuitry may then process the scaled feature vector using the trained classification model. For example, during a training phase the minimum/maximum values, or the standard deviation and mean, of the numeric values encountered for a particular feature of the feature vector can be determined, and these can be used to generate the scaling parameters so that different features which have raw values in different scales of reference can be mapped onto a common scale. Hence, the scaling means that a feature with a relatively low numeric value is not swamped by features with larger numeric values, so that each feature can make a more equal contribution to the outcome of the classification model than if the raw feature vector was processed directly.

Scaling each feature of the feature vector onto a common scale of reference can also help to identify which particular features are contributing to an adverse health score. When processing a newly captured feature vector using the previously trained model, the same scaling parameters derived from the training set of feature vectors can still be applied (that is, the scaling parameters do not change in the operation phase, but are fixed at the end of the training phase). If the engine behaviour changes so that a particular parameter is now outside the range of values observed during the training, then it will have a particularly high value or a particularly low value when mapped onto the common scale used across each of the features of the feature vector. E.g. with the example of a fixed scale between 0 and 1, during the operational phase a value may be observed which is less than 0 or greater than 1, indicating that it lies outside the range observed in training. Hence, by identifying one or more selected features which have the largest or smallest scaled feature values on the common scale among the features of the scaled feature vector, this can provide an indication of which particular features are most likely to be causing the problem with the engine. An indication of these features can be output together with health indication itself, to provide additional diagnostic information which could be used to identify possible causes of the fault.

In general the classification model used to generate the health indication may be any machine learning or artificial intelligence based model, e.g. a neural network could be used. However, in general the trained classification model may comprise a single-class classification model. A single-class model is a model which learns properties of a single set of training samples. When a subsequent sample is input, the model judges whether it is from the same class as the training set or is different. This contrasts with multi-class classification models which are provided with two or more distinct classes of training samples and attempts to learn the differences between each of those classes. A single-class classification model is well suited to engine health monitoring because of the limited amount of training data that will be available relating to faulty engines.

While a range of different single-class classification models are available, a particularly useful type of model can be a single-class support vector machine (SVM). An SVM may be characterised by a number of support vectors which define the decision boundary for the model. When a new input is supplied to the SVM, it can be compared with the location of the boundary defined by the support vectors, to identify a quantitative indication of deviation from the healthy behaviour characterised by the boundary. Positive and negative values of the health score may indicate feature vectors lying inside and outside the boundary, so give a clear indication of whether the engine is healthy or faulty, as well as a quantitative indication of how healthy or how faulty the engine is.

In general, in use the engine health diagnostic process may include two phases, a training phase when the training set of feature vectors are identified and used to train the classification model, and an operation phase in which vibration sensing of the same engine continues and the corresponding vibration sensor data is used to generate corresponding feature vectors which are tested using the trained model to identify the health indication.

In some implementations, the engine health diagnostic apparatus may implement the operation phase, but not the training phase. Instead, the model parameters defining the trained classification model may be determined beforehand using a different device that performs the training phase. Hence, the engine health diagnostic apparatus itself need not have circuitry for training the classification model. For example, the model could be trained using software running on a general purpose computer, which processes the vibration sensor data captured in the training phase, and generates the model parameters which are then embedded within the engine health diagnostic apparatus for use during the operation phase.

However, a more flexible system may provide circuitry on board the engine health diagnostic health apparatus for performing the training phase as well. Hence, the apparatus may have model storage circuitry for storing the model parameters which define the trained model, and training circuitry for updating the model parameters based on the latest training set of feature vectors. In this case, when first installing the apparatus on a particular engine, the training phase may be performed to train the model based on an initial training set of feature vectors, and then once the model has been trained, the apparatus can be switched to the operating mode in which the model parameters stored in the model storage circuitry are no longer updated, and are used to calculate the health indication for subsequently captured feature vectors based on ongoing data from the vibration sensors. The point at which the device is switched from the training mode to the operating mode could be determined manually by a human operator, or could be automatic based on detection of the point when input of further training feature vectors does not significantly change the location of the boundary of healthy behaviour, for example. When training circuitry is provided on board the diagnostic apparatus, then this can also allow the model to be retrained at a subsequent stage if after a period of time it is found that the vibration behaviour of the engine has changed even though there is no fault (e.g. the change could be due to an external factor, e.g. replacement of a given component of the engine, or due to a change in the load or demand placed on the engine). Also, in certain scenarios idle periods when the engine would otherwise be out of operation could be used to gather a fresh training set of feature vectors for re-training the model.

The training of the model can be done in various ways. One way of determining the boundary of healthy operation can be to perform an algorithm which varies model parameters and selects as the final trained model parameters those parameters which maximise a margin between a predetermined fraction of outlying feature vectors of the training set and a remaining fraction of vectors of the training set. For example the predetermined fraction could be a few percent of the training set, and the training circuitry may attempt to define the boundary in such a way that that particular percentage of feature vectors is outside the boundary, with different definitions of the boundary being tried until the maximum average margin between the outline feature vectors and the remaining feature vectors has been found. Note that the predetermined fraction ("reject fraction") of feature vectors which are to be outside the boundary can itself be one of the parameters of the model which is adjusted to try to find the largest margin between the outline feature vectors and the remaining feature vectors.

In some implementations the diagnostic apparatus may comprise the vibration sensor for capturing the vibration sensor data. However, the apparatus could also be used in conjunction with external vibration sensors not provided with the diagnostic apparatus. For example, existing vibration sensors already provided within a given engine could be used. However, one advantage of the current approach is that it can detect potential engine faults based on data from retrofittable vibration sensors, which can be attached non-invasively to an engine while in situ, rather than relying on integral in-built sensors. Typical embedded engine sensors, such as pressure sensors, used in other approaches tend to be subject to wear and can reduce reliability of fault detection. In contrast, by using externally retrofittable sensors, these are less subject to wear and not tied down to a particular manufacturer or engine configuration. In one example the vibration sensors may comprise accelerometers.

The engine health diagnostic apparatus may have communication circuitry to communicate data to a remote site. This can be used to send the engine health indication or a parameter derived from the engine health indication to the remote site. Hence, rather than sending the raw vibration sensor data itself, the processing of this sensor data and the generation of the health indication can be performed on site at the location of the engine. This reduces the amount of data which needs to be communicated to the remote site, which can be particularly valuable because communication resources can be relatively costly especially if satellite or cellular communication is required. The communication cost can be reduced by transmitting the health indication instead. In some cases rather than transmitting the absolute value of the engine health indication, a derived parameter could be transmitted to further reduce the amount of data being transmitted. For example, the communication circuitry may communicate a differential engine health indication which indicates a difference between the engine health indication and a previously transmitted engine health indication, which may typically require fewer bits than the absolute value. The absolute values of engine health indications can then be reconstructed from the transmitted differential engine health indications at the remote site. In addition to the health indication or derived parameter itself, the communication circuitry could also communicate other information, such as a code identifying the particular features which are making the largest contribution to the health score (identified by which features are the maximum or minimum on the common scale as discussed above).

In some implementations, a single vibration sensor could be used and the engine health indication derived from the sensor data from the single vibration sensor. Even for a multi-cylinder engine, a vibration sensor provided at one cylinder could still enable information about other cylinders to be deduced, since the vibrations from one cylinder may propagate to another cylinder.

However, more reliable pinpointing of faults to particular cylinders can be achieved by providing several vibration sensors at the respective cylinders. The engine health diagnostic apparatus may therefore receive multiple sets of vibration sensor data received from the corresponding vibration sensors and use these to generate multiple feature vectors each corresponding to one of the cylinders. Each feature vector can then be processed using a trained classification model to generate a corresponding engine health indication so that multiple health indications are provided each corresponding to a respective cylinder. While in some cases each cylinder's feature vector could be processed by an identically trained classification model, in practice the patterns of vibration identified at particular cylinders during a particular fault may differ from cylinder to cylinder depending on the engine configuration. Therefore, it can be useful to provide a number of separately trained classification models, each trained based on data captured from a corresponding cylinder, with the health indication for a given cylinder being calculated using the corresponding classification model specific to that cylinder.

Figure 2:
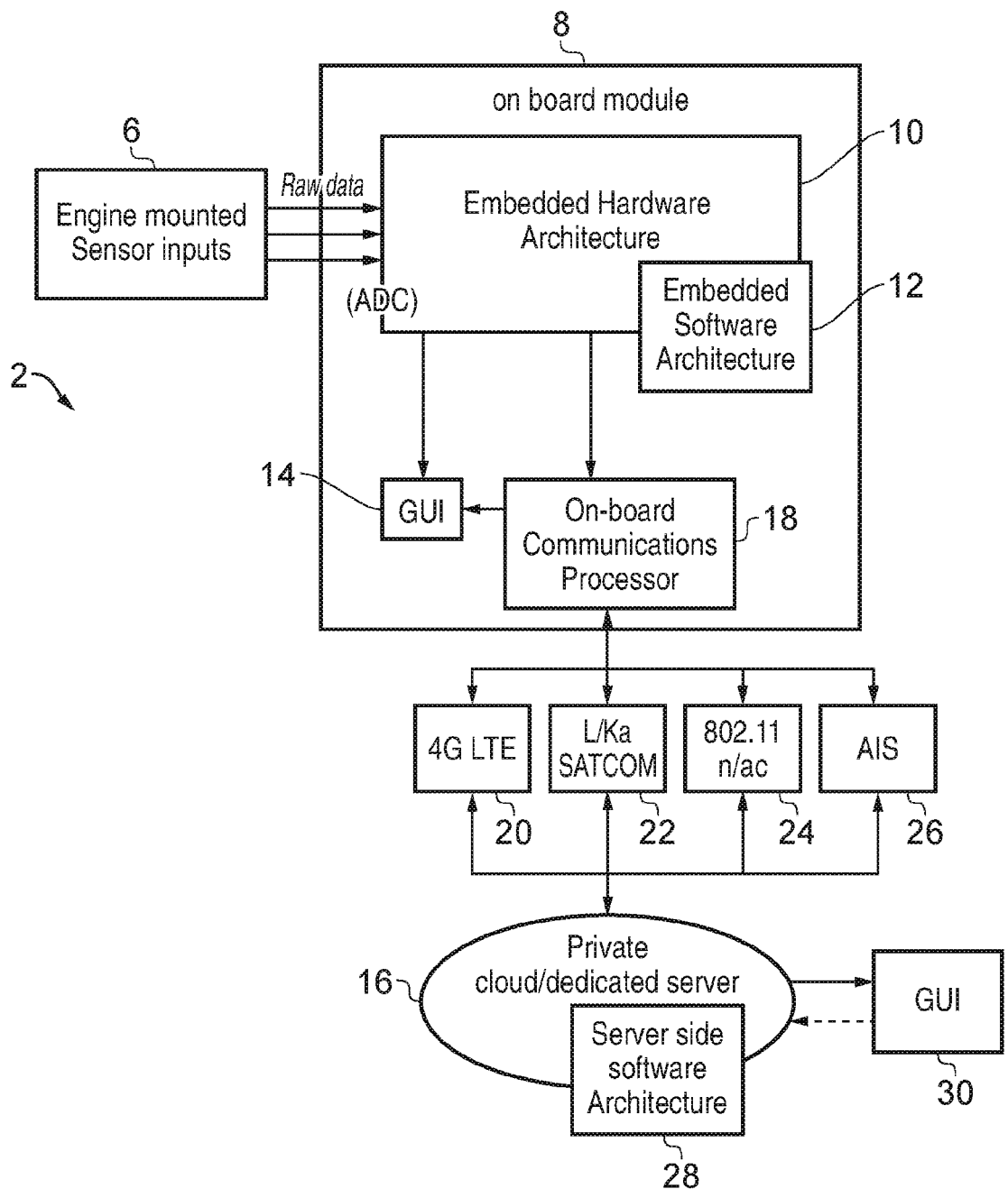

FIGS. 1 and 2 illustrate an example of a system 2 for analysing health of a reciprocating internal combustion engine 4. For example the engine 4 could be a diesel engine acting as the propulsion system for a maritime vessel, a generator for generating electrical power, or any other type of reciprocating internal combustion engine. The system 2 comprises a number of engine mounted sensors 6 mounted on the engine 4, and an on board engine health diagnostic module 8 for receiving the sensor data, processing the sensor data to identify features, processing the identified features using a trained classification model to generate a health indication for the engine 4 and outputting the health indication. The engine health diagnostic module 8 may comprise one or both of an embedded hardware architecture 10 and an embedded software architecture 12 for processing the sensor data and generating the health indication. For example the embedded hardware architecture 10 may comprise bespoke hardware implements in the processing of the sensor data, such as a field programmable gate array (FPGA), while the embedded software architecture 12 could comprise a general purpose processor executing software implementing the sensor data processing. The generated health indication can be displayed locally on the on board module 8 via a graphical user interface (GUI) 14, or can be communicated to a remote server 16 through an on board communications processor 18. The communication processor 18 may support a single type of communication method, or could support more than one. For example, any one or more of the following communication methods could be used for the communication: cellular communication 20 such as 4G LTE, satellite communications 22, local wireless communications 24 such as 802.11n/ac (WiFi®) or the automatic identification system (AIS) 26 used for identifying and locating shipping vessels by exchanging data by other nearby shore based stations or satellites. The health indication transmitted to the remote server 16 can then be analysed at the server side by a software architecture 28 and displayed to an operator of the server via another graphical user interface 30. For example, the health indications received over a period of time can be displayed graphically to enable an operator to identify changes which could identify faults, for use in deciding whether an engineer should go and investigate the engine, or scheduling repair or maintenance operations.

More particularly, the system 2 uses non-invasive sensors which can be retrofitted to a range of different engines (i.e. not tied down to a particular manufacturer or engine configuration), while using an artificial intelligence approach to understand the sensor data and provide a quantitative measure of individual cylinder health which allows for detection and classification of engine faults much earlier than a system which simply compares vibration readings against certain predefined thresholds. The analysis of the sensor data is done at the engine site itself, and this can then be coupled to a range of different communications bearers, including those with a low data rate, to send processed information for comparison and storage back on the cloud. In this way, an engine 'signature' can be captured during installation and test phase, stored on the cloud, and only the differences to that signature be transmitted to enable comparison of trends. A quantitative engine healthiness scoring system is used, avoiding the "how serious is Amber?" problems associated with simple threshold based measurements. The health score can feed graphical user interfaces that present the information in way to succinctly inform users (both at the engine site, and at the remote site) of which cylinder in the engine is developing a problem, as well as the underlying rate of change. The latter point is important as an increasing rate of change could be the precursor to serious faults or catastrophic failures. Secondary, or "non-cylinder related", faults such as main bearings, fuel pump, variations in lubricant temperatures and turbo-charger imbalance can also be derived from cylinder vibration measurements.

Figure 3:
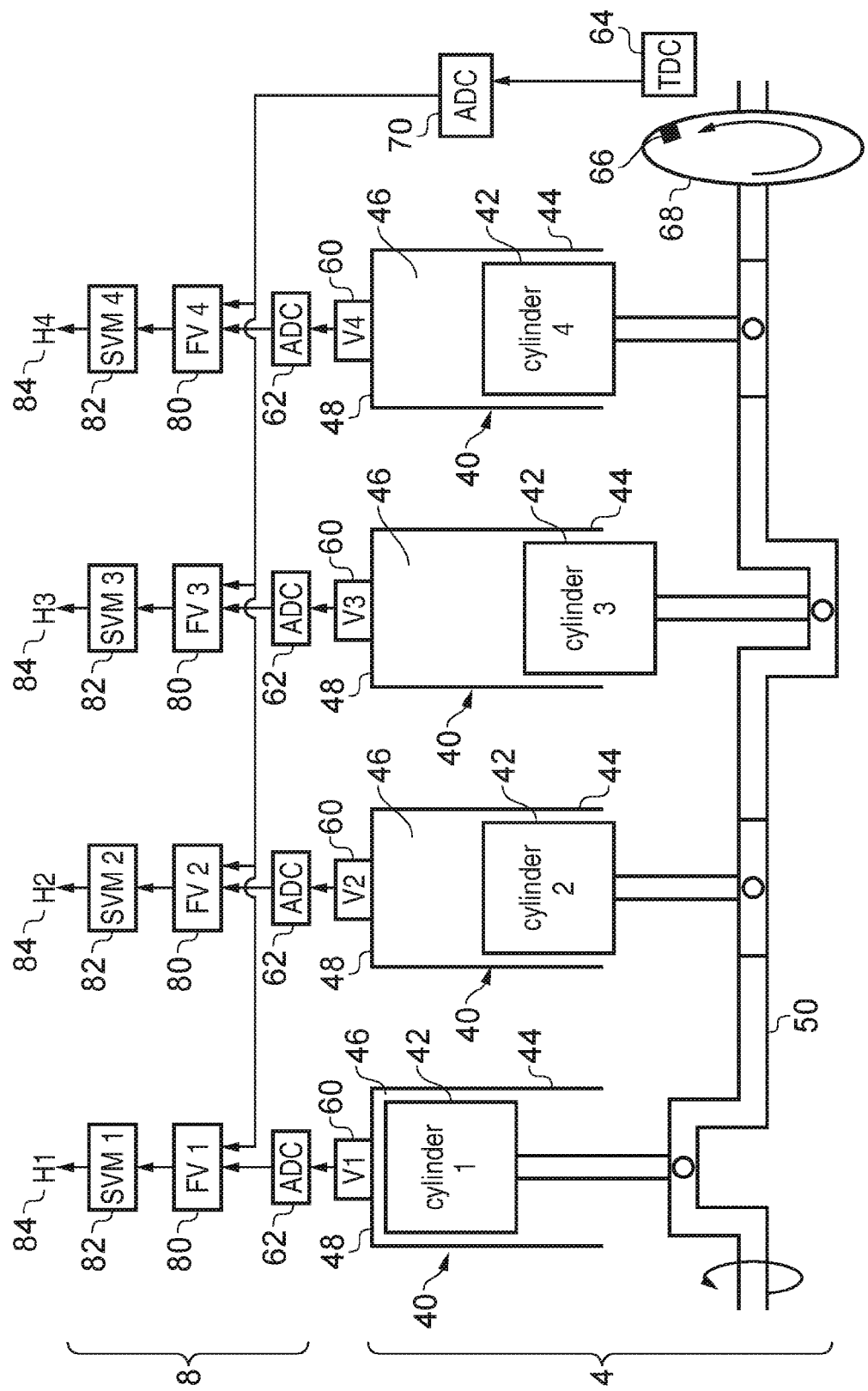
FIG. 3 illustrates an example of using vibration sensors provided at respective cylinders of a reciprocating internal combustion engine to provide health indications for each cylinder.

FIG. 3 schematically illustrates the processing performed by the on board engine health diagnostic apparatus 8 in more detail. As shown in FIG. 3, the engine 4 may comprise a number of cylinders 40 with each cylinder comprising a piston 42 which reciprocates within a cylinder casing 44 to compress a fuel-air mixture within a space 46 between the top of the piston 42 and the cylinder head 48. The pistons 42 drive a crank shaft 50 and the respective cylinders 40 have their pistons 42 coupled at different angular positions around the crank shaft so that each cylinder fires at a given point of the operating cycle of the engine. While FIG. 3 shows an example with four cylinders, it will be appreciated that the technique can be applied to an engine with any number of cylinders. Also FIG. 3 shows a grossly simplified representation of each cylinder for conciseness but it will be appreciated that each cylinder may comprise many other components such as a fuel injector, exhaust valve etc. The on board diagnostic module 8 can be fitted retrospectively to any known design of reciprocating internal combustion engine, so the technique is not limited to any particular form of engine.

As illustrated in FIG. 3, a vibration sensor 60 is retrofitted on the cylinder head 40 of each cylinder. Each vibration sensor 60 comprises an accelerometer. For example, industrial constant current accelerometers may be mounted onto the exterior of the engine (e.g. using a magnetic attachment). In this example, each vibration sensor is placed on the top of the individual cylinder heads 48, as research studying multiple locations for the sensor has found that this gives the best results, it would also be possible to place the accelerometers at other locations on the engine. The accelerometers produce voltages, based upon the magnitude of the deflection of the cylinder head, which are converted through an analog-to-digital converter (ADC) 62 into digital measures of vibration, e.g. in units of g. In addition to these accelerometers, a top dead centre (TDC) sensor 64 is attached on the flywheel 68 of the engine. The TDC sensor 64 senses a small magnet 66 rotating on the flywheel 68, which, when passing the fixed sensor head 64, induces a small voltage pulse. This pulse is fed through an ADC 70 to provide a square pulse, providing an accurate reference to the timing when the engine crankshaft passes through TDC for a particular cylinder (the top dead centre (TDC) position of a given cylinder is when the piston is furthest from the axis of the crankshaft). The TDC sensor 64 is one example of a sensor for sensing the relative timing of the cylinder relative to the operation phase of the engine, but other examples of crankshaft angle sensors could also be provided. More generally any sensor which senses some parameter of the engine which allows vibrations caused by a cylinder firing to be correlated with the phase of the engine cycle could be used.

The hardware and/or software architecture 10, 12 used for processing the captured sensor data can take various forms. For example, the ADCs 62, 70 may be implemented on a datalogger and the datalogger data may be output to a general purpose processor running software for analysing the sensor data. Alternatively, an FPGA (field programmable gate array) may be provided coupled to an embedded processor, i.e. a system on chip (SoC). An FPGA enables faster computation of the key features arising in the combined datasets from the accelerometers 60 and TDC sensor 64, to support better real-time classification as to when the engine health is degrading i.e. developing a fault, or if a fault is already present. Hence, in some cases the classification model processing may be run as VHDL/Verilog hardcoded onto the FPGA.

Either way, the embedded hardware architecture 10 and/or software architecture 12 of the module 8 performs a number of channels of sensor data processing, with each channel performing combined analysis of time and frequency domain features and peak vibration features of the vibration sensor data and providing a scoring system to quantify deviation of the observed features of the vibration sensor data from a healthy state. As shown in FIG. 3, each channel corresponds to one of the cylinders and receives different vibration sensor data from the ADC 62 corresponding to the vibration sensor 60 mounted on the corresponding cylinder, but the same timing data from the TDC sensor 64 (which is used as a reference for identifying the timing of the peak vibration in the accelerometer data). Each channel of processing includes two main stages. First, a feature vector 80 is generated by processing the vibration sensor data and the TDC sensor data. The feature vector 80 has a number of feature dimensions each indicating a corresponding feature of the data captured for the corresponding cylinder 40. The feature vector is input to a trained classification model 82 and processed to output a corresponding health indication 84 characterising deviation of the detected feature vector from previously observed healthy behaviour for the corresponding cylinder. This processing will be described in more detail below. Hence, the module 8 outputs N separate health indications 84, each corresponding to one of the N cylinders of the engine 4.

The health indications can then be used to generate the packet data to be transmitted via the communication processor 18 to the server 16. In contrast to alternative techniques which output the raw sensor data to the server 16, by performing the feature vector generation 80 and classification model processing 82 locally within a module 8 on site at the location of the engine, the amount of data to be communicated to the server 16 can be greatly reduced, to avoid expensive bandwidth requirements for the communications. For example, the health indications 84 may only require a small number of bits to be transmitted as opposed to the vast quantities of sensor data received from the vibration sensors. The volume of data can be reduced further by encoding the health indications using a differential scheme where rather than transmitting the absolute values the difference with respect to a previously transmitted value is transmitted. Other options could be to only transmit health indications if they indicate a degree of engine health which is less than a certain threshold. In addition to the health indication itself, other data could also be transmitted to the server, such as an indication of which particular features of the features are of most concern. One benefit of transmitting a simple health indication and a code of relatively few bits indicating a pattern of features of interest is that the AIS 26 can be used for communications. The AIS has a very small amount of bandwidth available for transmitting binary data alongside the information required for vessel tracking for shipping based applications. Therefore, the ability to compress the health indication into a relatively small payload is therefore particularly advantageous as if the AIS can be used then the data can be transmitted at virtually no cost compared to use of more expensive cellular or satellite communication techniques. For applications other than shipping, the AIS is typically not available and other communication techniques can be used.

Figure 4:
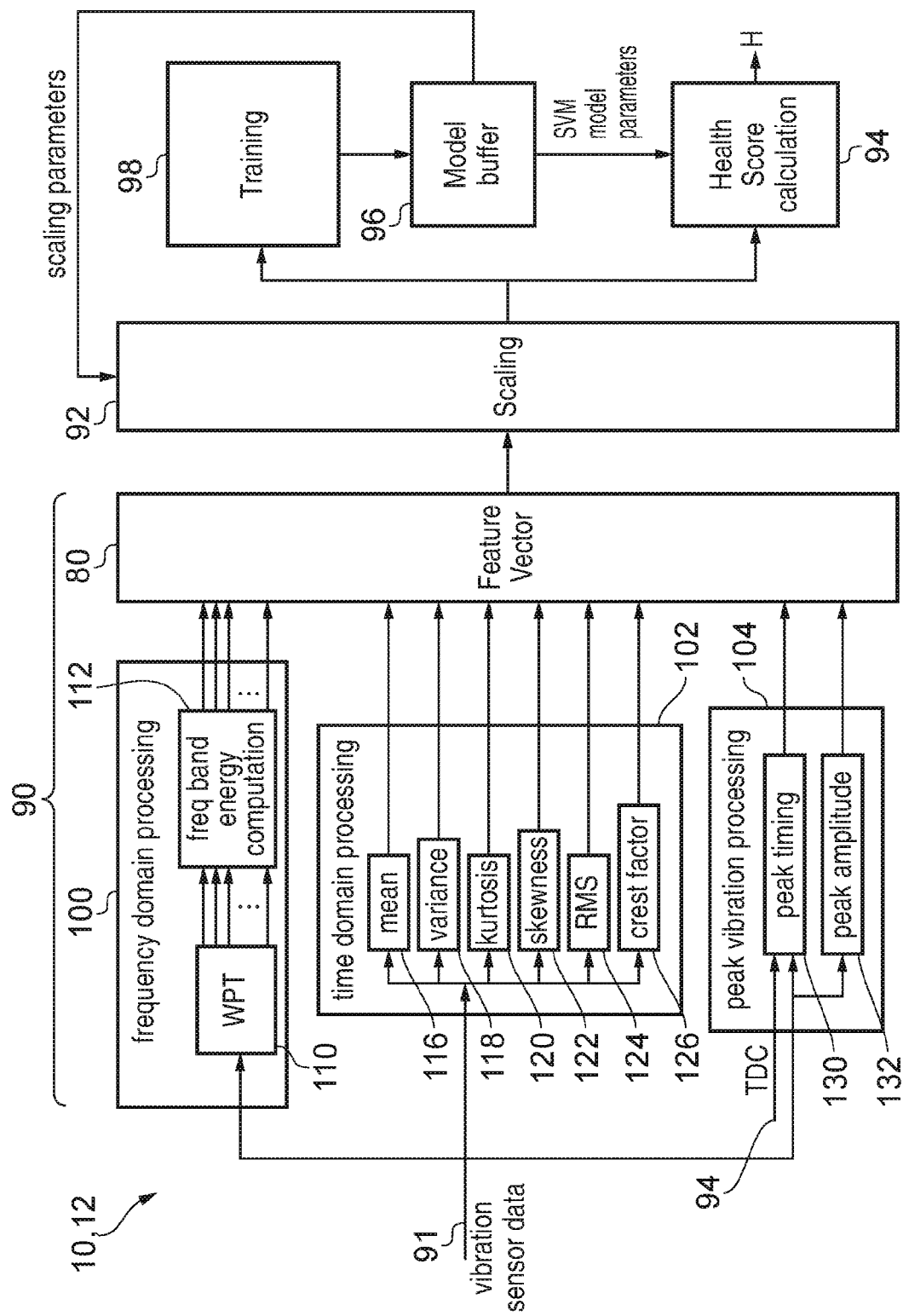
FIG. 4 illustrates an example of feature generation circuitry for generating a feature vector based on vibration sensor data and processing circuitry for processing the feature vector using a trained classification model.

FIG. 4 shows the processing provided by the embedded hardware and/or software architecture in more detail. The architecture comprises feature generation circuitry 90 for processing the vibration sensor data 91 and the TDC data 94 to generate a feature vector 80 corresponding to the sensor data, scaling circuitry 92 for scaling the parameters of the feature vector to map them onto a common scale of reference for each of the different feature dimensions of the vector 80, and processing circuitry 94 to perform the health score calculation based on the scaled feature vector. Optionally, the embedded architecture 10, 12 may also include a model buffer 96 for storing model parameters defined in the classification model used by the health score calculation processing circuitry 94 and training circuitry 98 for updating the model parameters 96 during a training phase as shall be discussed below. However, the training circuitry 98 and model buffer 96 can be omitted if an embodiment uses a fixed model without the ability to train the model, and in this case the model parameters could instead be hardcoded within the health score processing circuitry 94 or stored in read only storage, for example. While FIG. 4 shows the processing performed for a single channel of the health score calculation corresponding to a single cylinder, it will be appreciated that in the multi cylinder case of FIG. 3 each of the channels of processing may comprise the functionality shown in FIG. 4. For conciseness we shall refer to a single channel of processing below but it will be appreciated that this may be performed multiple times in parallel for each cylinder.

As shown in FIG. 4, the features in the feature vector 80 may include three main classes of features, namely frequency domain features 100, time domain features 102 and peak vibration features 104. The vibration sensor data 91 comprises a series of digital readings generated by the ADC 62 for the corresponding vibration sensor.

The frequency domain processing 100 comprises applying a wavelet packet transform 110 (WPT) to a given window of the vibration sensor data 91 to decompose the time domain series of vibration sensor data into signals in a number of distinct frequency bands. For example, the WPT may generate 512 distinct frequency features split up into frequency bands. Computation circuitry 112 may then compute, for each frequency band, the energy of vibration in the corresponding frequency band and output the computed energy as the corresponding feature of the feature vector. The energy in a given frequency band may correspond to the square of the signal generated WPT for the corresponding frequency band. Hence the feature vector 82 may include a number of frequency domain features which each correspond to the energy contained in the vibration signal in a given frequency band. While analysing data in the frequency domain with WPT is a relatively computation-heavy approach (with implications when implementing into a real-time system), it is particularly suited for the engine health monitoring, because frequencies will change if engine speed changes (FFTs for example, are better suited to constant speed samples), and wavelets can pick up interesting features, despite engine speed changes, due their complexity. This is particularly important when considering propulsion engines which invariably load-follow i.e. a demand is placed upon the engine which requires an increase in power output and therefore engine speed changes; if a monitoring/engine healthiness measurement were reliant upon constant speed samples, it would possibly flag this up as a 'fault'.

The time domain processing 102 includes calculating a number of statistical parameters based on the raw time series vibration sensor data 91. For example, for a given set of N vibration sensor readings $x_0$ to $x_{N-1}$, the time domain features may include any of the following:

the mean 116, e.g.

$$\bar{x} = \frac{1}{N}\sum_0^{N-1} x_i.$$

variance or standard deviation 118, i.e. variance $\sigma^2 = \Sigma_0^{N-1}(x_i - \bar{x})^2$ or standard deviation $\sigma = \sqrt{\Sigma_0^{N-1}(x_i - \bar{x})^2}$.

kurtosis 120, which provides a measure of the sharpness of the peak in the distribution of the samples within the current window. A high kurtosis indicates that the samples are clustered around the mean, while a low kurtosis indicates that there is a broader tail of values lying further from the mean. For example, one indication of kurtosis that could be used is $$K = \frac{\sum_0^{N-1}(x_i - \bar{x})^4}{\left(\sum_0^{N-1}(x_i - \bar{x})^2\right)^2}.$$

skewness 122, which provides a measure of how symmetric or asymmetric the distribution of samples is. For example, one measure of skewness that could be used is $$= \frac{\sum_0^{N-1}(x_i - \bar{x})^3}{\left(\sum_0^{N-1}(x_i - \bar{x})^2\right)^{3/2}}.$$

root mean square (RMS) 124, i.e.

$$x_{rms} = \sqrt{\frac{1}{N}\sum_0^{N-1} x_i}.$$

crest factor 126, which is a measure of the ratio of the peak value of a waveform to the root mean square value (i.e. $C = x_{max}/x_{rms}$).

By using time-domain analysis features alongside frequency domain analysis to determine the nature and behaviour of abnormalities in vibration data, additional types of faults can be detected. For example, without the use of kurtosis and skewness, while it would be possible to see the energy increasing/decreasing across the decomposed frequency bands (e.g. vibration getting worse), it would be difficult to deduce what percentage of incoming vibration data is exhibiting abnormalities (kurtosis) and if the scattering of vibration data points is symmetrical with respect to a normal distribution (skewness). A high kurtosis score (sharp distribution curve) and low skewness score (approaching normal distribution) will tell us that this malformation is reflecting an external cause (e.g. an engineer dropping a heavy object near the engine) rather than an internal fault in the cylinder. The time domain data can also help identify whether a fault being seen in data is simply the effect of an ageing engine, or if there genuinely is a problem.

The peak vibration processing 104 may identify a number of features relating to the timing at which the peak (maximum) amplitude of vibration is detected relative to the operating cycle of the engine. In a two-stroke engine the operating cycle of the engine corresponds to a single 360 degree rotation of the crank shaft and so the peak timing feature 130 may simply be an indication of the angle of the crank shaft at which the peak amplitude was detected for the corresponding cylinder. However, for a four-stroke engine the complete operating cycle of the engine is over two rotations of a crank shaft (720 degrees of rotation) and in this case in a peak timing processing 104 may not only identify the angle of the crankshaft but also whether peak firing point for a given cylinder occurs in the first 360 degrees or the second 360 degrees of crankshaft rotation. It will be appreciated that the peak timing parameter 130 need not explicitly identify the crank shaft angle in terms of degrees of rotation. Any value which is indicative of the crankshaft angle or some other operating phase of the engine could be used (e.g. the peak timing value does not need to be scaled to 360 degrees or 720 degrees. In addition to the timing parameter 130 the amplitude of the vibration at the peak timing point may also be output as another feature 132 of the feature vector. By including peak vibration timing features in the feature vector 80 in addition to time and frequency domain processing features, faults which cause late firing of a given cylinder can be detected which would be difficult to detect from the time and frequency domain features alone.

Note that in the analysis of peak vibration versus crankshaft angle, based on test data from a number of engines with different firing sequences (i.e. looking at 3 cylinder vs straight 8 cylinder), it has been observed that, over the full 720 degrees, for certain engines the peak vibration does not necessarily appear at firing of the cylinder, but rather on the exhaust stroke. This is extremely non-intuitive, given that the explosion in the cylinder at ignition occurs just before peak pressure, with the expectation this pressure wave will couple to the cylinder head, providing the largest deflection. However, consideration of the resulting piston dynamics, reveals that peak vibration can occur in the exhaust stroke given the combustion chamber is at a much lower pressure, and therefore there is much less dampening of the mechanical vibration from the movement of the piston, compared to when the piston is rapidly compressing the fuel/air mix at higher pressure. Hence, the peak vibration may not necessarily be the point at which the cylinder has fired, but nevertheless a delay in firing the cylinder will also delay the peak vibration, and so this does not adversely affect the methodology that has been employed. That is, even if peak vibration is not on the power stroke, it is used as a reference in the particular segment of the 720 degrees of crankshaft rotation, and can still be used to track changes in peak vibration timing versus crankshaft angle for an individual cylinder over time, which is a useful fault indicator. In practice, the relative timing of peak vibration relative to crankshaft angle will be specific to a given engine installation, and can be learnt in the training phase so that changes over time can be detected later during the operation phase.

The feature vector 80 comprising the time domain, frequency domain and peak timing features is input to the scaling circuitry 92 which scales each independent variable of the feature vector to a common scale of reference according to scaling parameters which were generated during a training phase. This ensures that each independent feature of the vector has a substantially equal contribution to the classification by the health score processing circuitry 94 even if their absolute values vary over different scales. The scaling circuitry 92 can scale each parameter using different techniques. In one example the scaling may use range scaling, where for each feature $f_i$ of the feature vector, the rescaled value $f_i'$ is calculated according to $$f_i' = \frac{f_i - f_{i-min}}{f_{i-max} - f_{i-min}},$$

where $f_{i-min}$ and $f_{i-max}$ are the minimum and maximum values for that particular feature $f_i$ encountered during the training phase. Alternatively the scaling circuitry 92 may use mean scaling where $f_i'$ is calculated according to $$f_i' = \frac{f_i - \overline{f}_i}{\sigma_i},$$

where $\overline{f}_i$ and $\sigma_i$ are the mean and standard deviation detected for the values of feature $f_i$ in the training set of feature vectors used to train the model. Hence, each feature of the feature vector has a corresponding set of scaling parameters ($f_{i-min}$ and $f_{i-max}$, or $\overline{f}_i$ and $\sigma_i$), which are learnt separately for each feature of the vector during training. During training, this results in each feature of the feature vector being mapped onto a common scale between the range 0 to 1. By fixing the scaling parameters during training, this means that if in the operational phase a particular feature then goes outside the range seen during training, then it will have a value outside of the range 0 to 1, and this can be detected as abnormal and flagged in the data output to the server 16. For example, a certain number of "top ranked" features with the maximum or minimum values persistently outside the ranges for those features in the training set can be identified, and a code indicating which particular parameters have exceeded the training range can be output as part of the data sent to the server 16.

Figure 5:
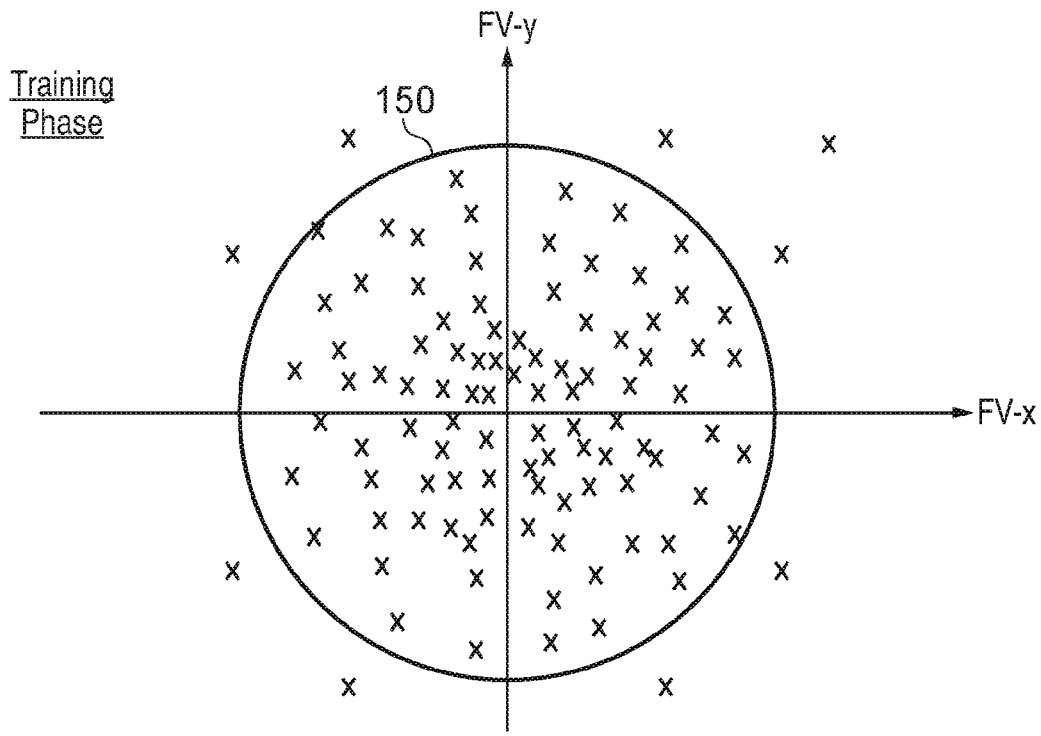
FIG. 5 is a conceptual illustration for explaining a training phase for training the classification model based on feature vectors captured during a healthy period of operation of the engine.
Figure 6:
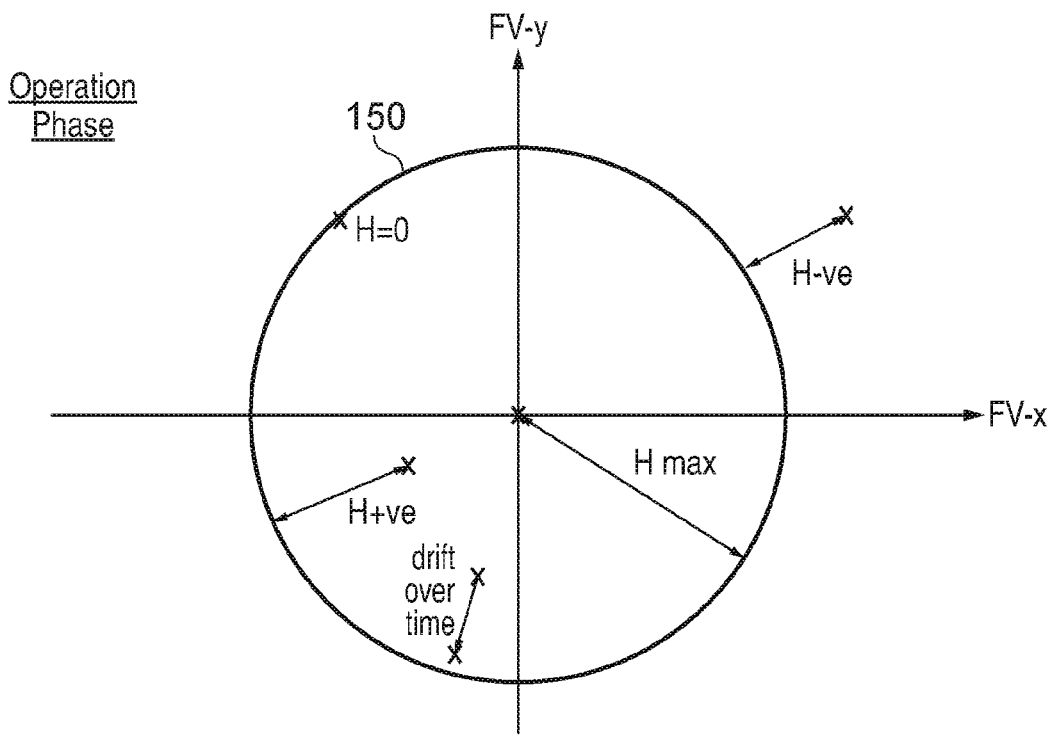
FIG. 6 is a conceptual illustration illustrating an operation phase when the trained model is used to generate a health indication which quantifies deviation of a feature vector from the boundary of healthy operation learnt during the training phase.

The scaled feature vector is input to the health score calculating circuitry 94 which classifies the feature vector according to a trained classification model. In particular the classification model may be a one-class model, and in some cases may be a support vector machine. FIGS. 5 and 6 schematically illustrate the training phase and the operational phase of the model respectively. For ease of understanding, FIGS. 5 and 6 assume a feature vector 80 with only two independent variables FV-x and FV-y. hence, each feature vector can be plotted graphically on a graph with the two independent variables shown on the X and Y axis.

During the training phase shown in FIG. 5, a training set of feature vectors may be calculated corresponding to vibration sensor data 91 collected at a series of instances in time during a period when the engine is operating healthily. The judgement as to whether the engine is healthy can be made by an engineer supervising the training process for example. it will be appreciated that an engine will never be 100% perfectly healthy, but the engineer may be able to judge that there are no apparent faults in the engines operation. As shown in FIG. 5, during healthy operation of the engine it may be generally be expected that most feature vectors cluster in a certain region of the feature space but there may be some outlying feature vectors which lie further away from the main cluster of feature vectors. A one-class support vector machine attempts to classify the training set of data by defining a boundary 150 which demarks the bulk of the training set of features vectors from a certain percentage of outlying feature vectors. The model can be characterised by a number of control parameters including for example a kernel width which defines the complexity of the function used to represent the featured boundary 150 and a reject fraction which indicates the particular fraction of outlying feature vectors which are to be outside of the feature boundary 150. For example, various kernel functions could be used, e.g. a linear function or a non-linear function. A Gaussian function can provide reasonable model performance. The kernel width defines how convoluted ("wiggly") the boundary function can be. If the function is relatively simple then this may not allow the boundary to adequately deal with more complex classifications where the boundary needs to wiggle back and forth to accommodate the clustering of the training set of feature vectors, but if the function is too complex then this may result in the boundary being influenced unduly by noise in the training set of feature vectors, so that the function ends up being over fitted to particular data values which may not be representative of the broader class of features as a whole being learnt by the model. An example of a suitable kernel function that can be used with the function. While FIG. 5 for simpler understanding shows a two dimensional feature vector and hence the boundary is a line in the feature space, with greater dimensions the feature vector of the boundary function may also be defined in greater numbers of dimensions. For example for a three dimensional feature vector the boundary may be a two dimensional plane, and more generally for an N-dimensional feature space, the boundary function may typically be an (N−1)-dimensional function. Hence the boundary function can be viewed as a hyperplane in N-dimensional space which is defined by a kernel function.

In order to train the classification model, an optimisation algorithm may be performed to vary parameters of the boundary function 150 with the aim of maximising the margin on average between the boundary 150 and the predetermined reject fraction of outline feature vectors which are to lie outside the boundary. This exploits the observation that if the margin between the boundary 150 and the outlying fraction of the feature vectors is larger, then this means that the boundary 150 is at the best location for classifying the common properties of the remaining feature vectors that lie within the boundary. In this regard the margin between a given feature vector and the boundary may be calculated as a distance in Euclidian space between the feature vector and the edge of the boundary at the minimum distance away from the feature vector. An example of a training technique for training a one-class SVM may be found in Schölkopf et al, "Support Vector Method for Novelty Detection", in NIPS (Vol. 12, pp. 582-588), 1999, and Schölkopf et al. "Estimating the support of a high-dimensional distribution", Neural computation, 13(7), pp. 1443-1471, 2001.

In some embodiments, the training phase may attempt to train the model multiple times using different combinations of the reject fraction and the kernel parameter, and then choose the trained model which leads to the greatest margin on average between the outlining fraction of feature vectors and the boundary 150. Other embodiments may simply choose a single value of the kernel function width and the reject fraction and then try to find the optimum definition of the boundary complying with those parameters. Either way in general the boundary 150 may be defined by a number of support vectors which indicate locations on the boundary and such support vectors may be stored to the model buffer 96 to characterise the trained model.

The training phase may be performed when the sensor 6 and model 8 are first installed for a given engine in order to learn the particular vibration behaviour encountered for that particular engine.

On the other hand, once the training phase is complete then the parameter stored in the model buffer 96 can be used in the operation phase to calculate the health score. As shown in FIG. 6, the model parameters define the boundary 150 of healthy operation which was learnt from the training set of feature vectors captured during a healthy period of operation. In subsequent operational processing, newly detected feature vectors can then be compared with the boundary to identify the distance between the new feature vector and the boundary 150. Again, the distance may be calculated as the Euclidian distance between the feature vector and the boundary 150 in N-dimensional hyperspace, where N is the number of features of the feature vector.

Hence, the health score may indicate a quantitative value which characterises how much the new feature vector has deviated from the boundary of healthy operation. When the feature vector is exactly on the boundary 150 then this may provide a health score H of 0 since there is no distance between the feature vector and the boundary. Positive and negative values of the health score H may then indicate values lying outside or inside the boundary. Which of the positive and negative values represents outside the boundary and which represents inside the boundary is a design choice and this can be done either way round. In the example of FIG. 6 a positive health score H represents that the feature vector is inside the boundary 150, representing a healthy engine, while negative health score represents unhealthy engines for which the feature vector lies outside the boundary. By providing such a quantitative health score, it is possible to characterise not only that there is a potential fault, but also evaluate the degree of engine health when no fault is yet been detected. For example a feature vector that lies further inside the boundary represents a more healthy engine than a feature vector closer to the edge of the healthy region. Also changes in the value of the health score over time, which may reflect the onset of a problem which could become more significant later, can be detected.

Aside from observation and analysis of longer term trends, the health score can also provide reference data on how an engine is behaving before and after servicing e.g. while in theory a service will improve the healthiness of an engine, if it is a particularly invasive service or mistakes are made during the service, there is the possibility there will be a negative impact on engine performance. Taking an extreme example; this could be if piston rings are replaced, but are incorrectly installed e.g. upside-down, which has been seen to occur in practice. The monitoring device discussed above could quickly detect that a mistake has been made in servicing, to allow the mistake to be rectified.

Also, the health score can be evaluated for different environments or operating conditions of the engine, and analysis of the historical trends in this data could be used to help predict the optimal engine configuration or indeed the optimal engine selection for a particular application in which an engine is to be installed in future.

Note that FIGS. 5 and 6 are conceptual illustrations of the SVM model. The real model cannot be represented graphically in this way, as it is a high-dimensional model, but the conceptual illustrations in FIGS. 5 and 6 illustrate the principles behind the model using an example in two dimensions. It will be appreciated that these are merely conceptual illustrations rather than any actual picture of the actual SVM model used in the module 8.

Figure 7:
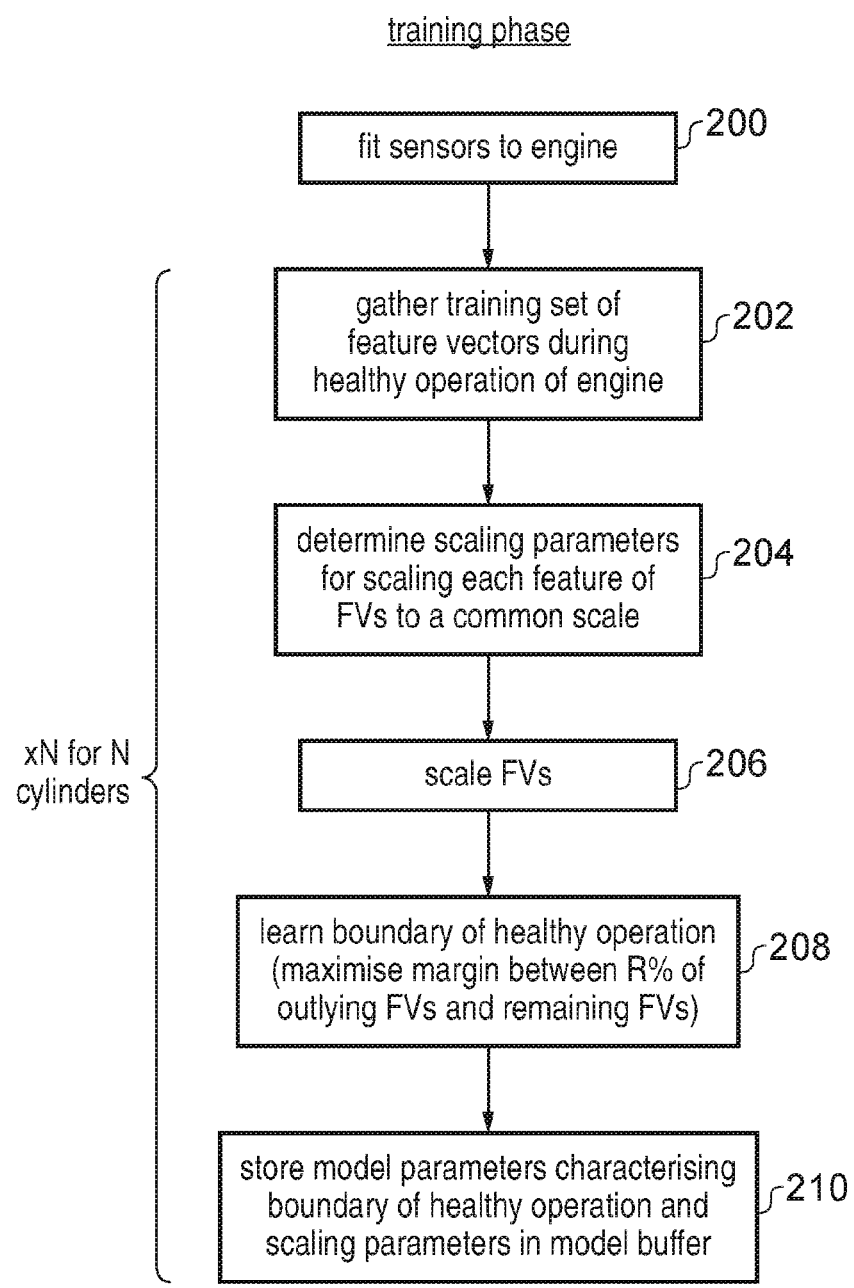
FIG. 7 is a flow diagram showing a method of training the classification model.

FIG. 7 is a flow diagram showing a method of training the model. The training could be performed by onboard training circuitry 98 within the embedded module 8 or by software which could execute within the module itself 8 or externally on a separate device in order to generate the model parameters which will be embedded in the module 8. At step 200 the vibration sensor 60 and TDC sensor 64 are fitted to the particular engine 4 which is to be monitored for ongoing health issues (alternatively, if the engine already has suitable sensors, step 200 can be omitted). At step 202 the training set of feature vectors are gathered during a period of healthy operation of the engine. For example the training set may comprise a certain number of feature vectors, e.g. in the range of tens of thousands for example. At step 204 the scaling parameters for scaling each feature of the feature vectors to a common scale are determined. This is done independently for each feature of the feature vector, based on the range of values detected for that feature across the training set of feature vectors as a whole. For example, each feature may be scaled based on the minimum and maximum values encountered or based on the mean and standard deviation as discussed above. Having determined the scaling parameters, at step 206 each of the feature vectors is scaled using the determined parameters to generate the scaled feature vectors.

At step 208 the boundary of healthy operation 150 of the classification model is learnt, by varying parameters of the model to maximise a margin between R % of the outlying feature vectors of the training set and the remaining (100−R) % of feature vectors, where R is the reject fraction. Step 208 could be repeated multiple times for different values of R and/or for different types or parameters of boundary function, in order to find the set of parameters which gives the maximum average margin between the outlying feature vectors and the boundary enclosing the remaining feature vectors. Having found the location of the boundary, at step 210 model parameters are stored in the embedded module 8 which characterise the location of the boundary 150, and also the scaling parameters determined at step 204 are stored. For example these can be stored in the model buffer 96. While FIG. 7 shows the training process for training a single class SVM model corresponding to data from a single cylinder, it will be appreciated that this process can be repeated N times for the N cylinders of the engine to generate a number of distinct sets of model parameters which each define a corresponding SVM for classifying the vibration data from the corresponding cylinder.

Figure 8:
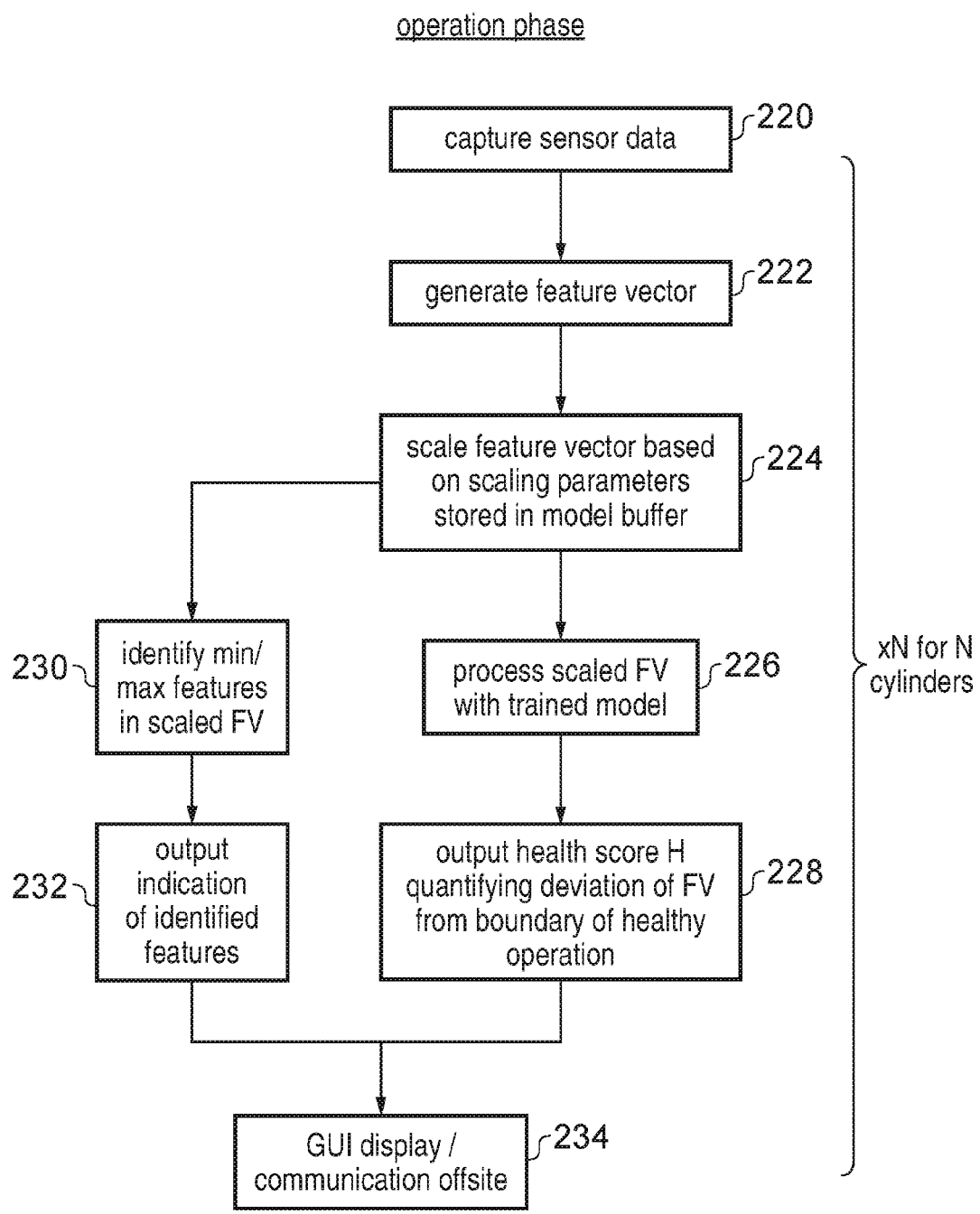
FIG. 8 is a flow diagram showing the operation phase when the trained model is used to generate a health score indication.

FIG. 8 is a flow diagram illustrating the operation phase of the embedded module 8. At step 220 the sensor data is captured by the vibration sensors 60 and the TDC sensor 64 fitted to the engine. At step 222 the feature generating circuitry 90 generates the feature vector providing a number of features of the sensor data including frequency domain features, time domain features and peak vibration timing features as discussed above. At step 224 the generated feature vector is scaled by the scaling circuitry 92 based on the same scaling parameters stored in the model buffer 96 which were derived from the training phase. At step 226 the scaled feature vector is processed using the trained classification model by the processing circuitry 94, to generate the health score H which quantifies the distance of the feature vector from the previously learnt boundary 150. At step 228 the health score is outputted.

Meanwhile, in parallel with steps 226 and 228, at step 230 the features of the scaled feature vector which have the minimum or maximum values on the common scale reference are identified. For example the processor may identify a certain number P of the top ranked features which may be contributing most to the particular health score determination. At step 232 an indication of the identified features may be output. For example each feature could be identified individually or a combined feature code representing some particular combination of features may be output. At step 234 the health score and the indication of identified features are output using either the GUI display 14 which is local to the onboard module 8 or through communication to the offsite server 16. This then allows for an analysis of the identified health score in order to schedule maintenance or repair operations as required. Again, the process may be repeated N times for N cylinders of the engine in order to provide cylinder-by-cylinder health score information to allow operators to pinpoint faults to a particular cylinder of the engine.

In some cases, in addition to outputting the health score itself (or parameters derived from the health score), local storage could be provided at the site of the engine to store a certain amount of raw vibration sensor data for a recent window of time. Alternatively, the feature vectors could be stored in the local storage. When no problems are identified, the local storage can continually be overwritten with more up to date sensor data. However, when an adverse health score is detected, the system operator can then choose to examine the recently captured vibration data in more detail to investigate the problem more thoroughly. Hence, while the raw sensor data or the feature vectors would not routinely be transmitted to the remote server 16, there is the option to call these up if required.

The sampling rate of the sensors 6 used to supply the vibration sensor data can be varied. In general, the sampling rate selected may be a trade-off between model performance against storage capacity and processing resource required. Our research has shown that a sampling rate of 2.4 kHz can be sufficient for normal monitoring, but a higher sampling rate such as 32 kHz may offer a greater variety of options for fault detection which could be used in scenarios where the level of uncertainty is greater. One approach can be that a lower sampling rate is used for normal monitoring to conserve storage capacity and processing power consumption, but if any problems are detected, the system can be switched to a higher sampling rate to reveal more information about the nature of the problem.

The techniques described above have been tested using two approaches: firstly by monitoring vibrations in a "real" marine diesel engine during real life operation (e.g. on a ferry or tugboat) and observing trends in the health indication over time; and secondly by operating a test engine in the lab in which various common types of engine fault can be introduced intentionally, and observing the change in the health indication when each type of engine fault is introduced.

Figure 9:
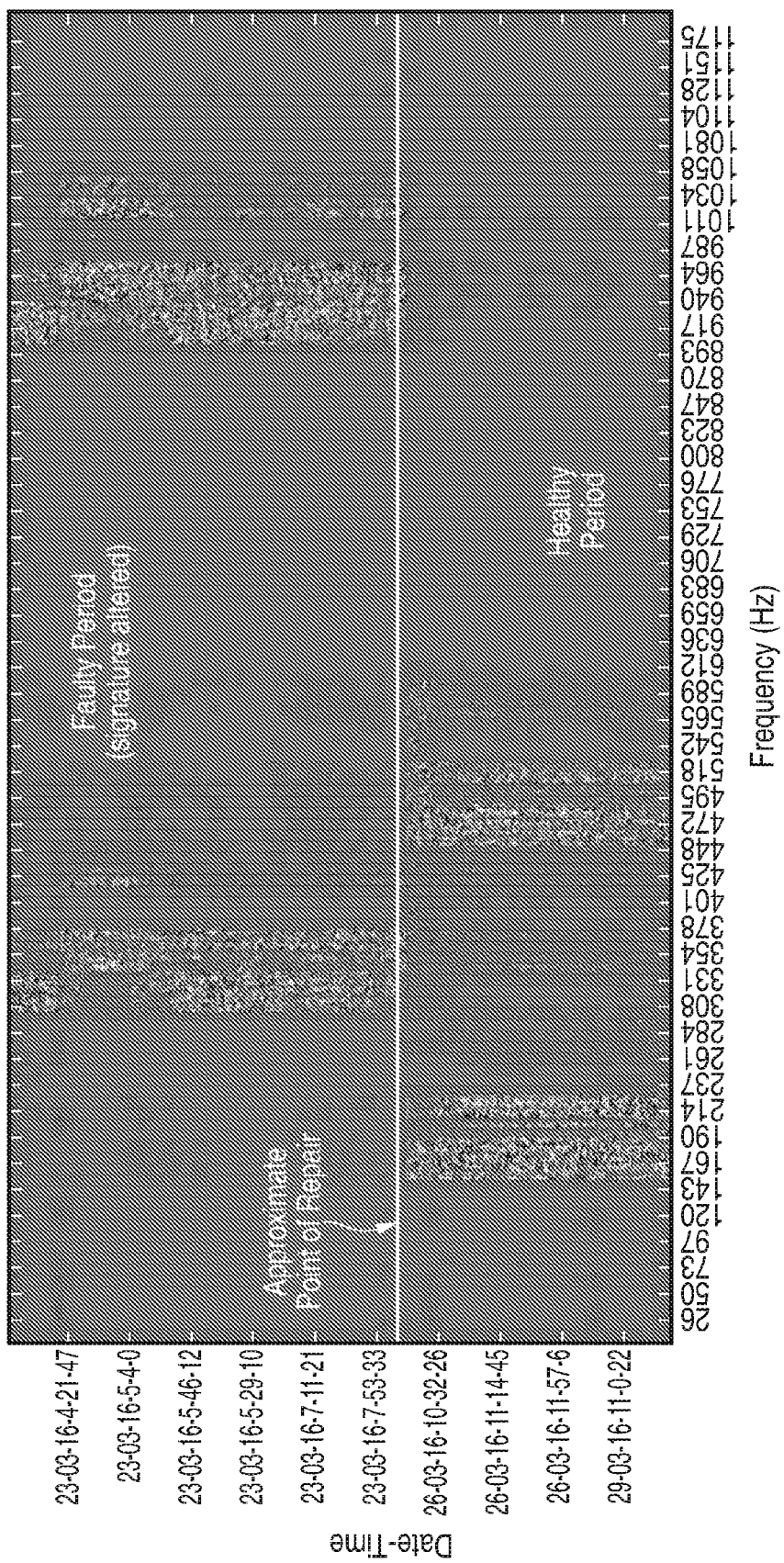
FIG. 9 illustrates a heat map showing how a fault can change the distribution of energies in different frequency bands of the vibration data.

FIG. 9 shows an example of the change in frequency band energies in a faulty engine relative to a healthy engine. FIG. 9 is a heat map in which the different colours represent different energies of vibration (lighter colours represent higher energies in this example), with the colours plotted against frequency band on the x-axis and time on the y-axis. The data in FIG. 9 was collected for a marine diesel engine on a tugboat. Shortly after monitoring began, a fault was identified on the engine, which was repaired on 23 Mar. 2016. FIG. 9 clearly shows how the signature of frequency band engines changed dramatically between the faulty period and the subsequent healthy period. Hence, this shows that faults can be identified from the frequency domain features of the feature vector. Similar changes in frequency band energy signature have been observed for other engines, e.g. when caused by a fuel starvation fault.

Figure 10:
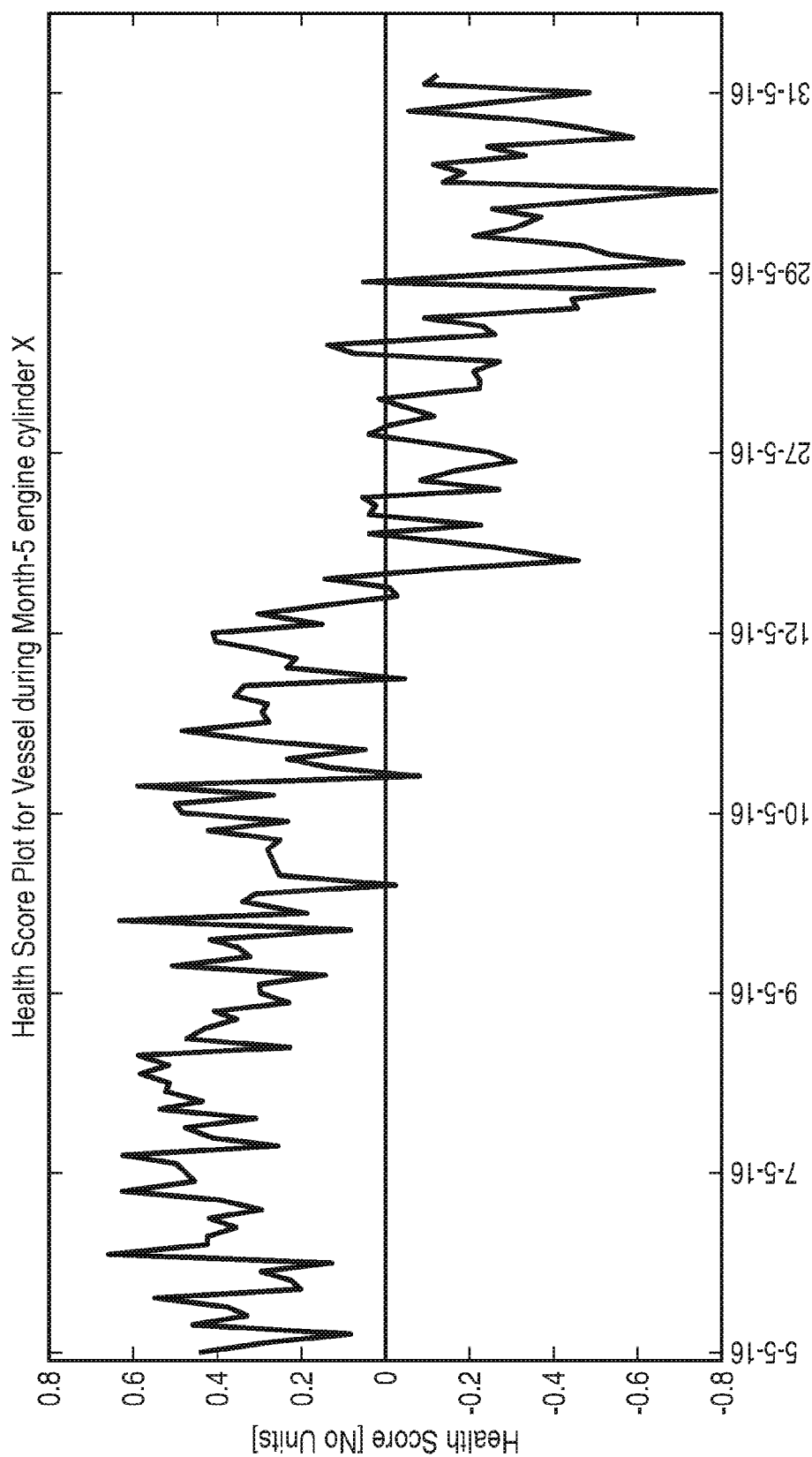
FIG. 10 shows drift of the engine health indication over time.

FIG. 10 shows a plot of the engine health indication calculated using the onboard diagnostic module 8 for a particular cylinder of a real life engine on board a vehicle ferry, when observed in operation over a period of a month. As shown in FIG. 10, initially the engine health indication was positive, but over the course of the month the engine health indication dropped below zero and the change in the engine health indication over time indicates a deterioration in engine health. The operators of the vehicle ferry engine were unaware of any fault when our module 8 alerted them to the problem. On investigation, it was found that the fault detection was correlated to a gradual drop in cylinder exhaust temperature while under load, as well as a drop in cylinder peak pressure compared to its neighbours, and some time later (after continued deterioration of the engine), it was found that the exhaust temperature at idle was significantly higher (up to 100° C.) than its neighbours. While the specific cause of the fault was not identified (the engine is currently undergoing a service/rebuild to investigate the specific problem), the techniques discussed above allowed the presence of a fault to be identified non-invasively several months before threshold-based monitoring for comparing temperature or pressure measurements with fixed thresholds would have shown sufficient change to be able to indicate the problem to the on-board engineers.

Hence, it will be appreciated that the techniques discussed above do not necessarily need to identify the specific cause of the fault (although information on which particular features of the vector are contributing most to an abnormal health score can help with attributing the cause of the fault). Even if the cause cannot yet be identified, the techniques discussed above can detect the presence of a potential fault much earlier than existing techniques, enabling an engineer to step in and investigate earlier and reducing the chance of a more catastrophic failure at a later time.

Figure 11:
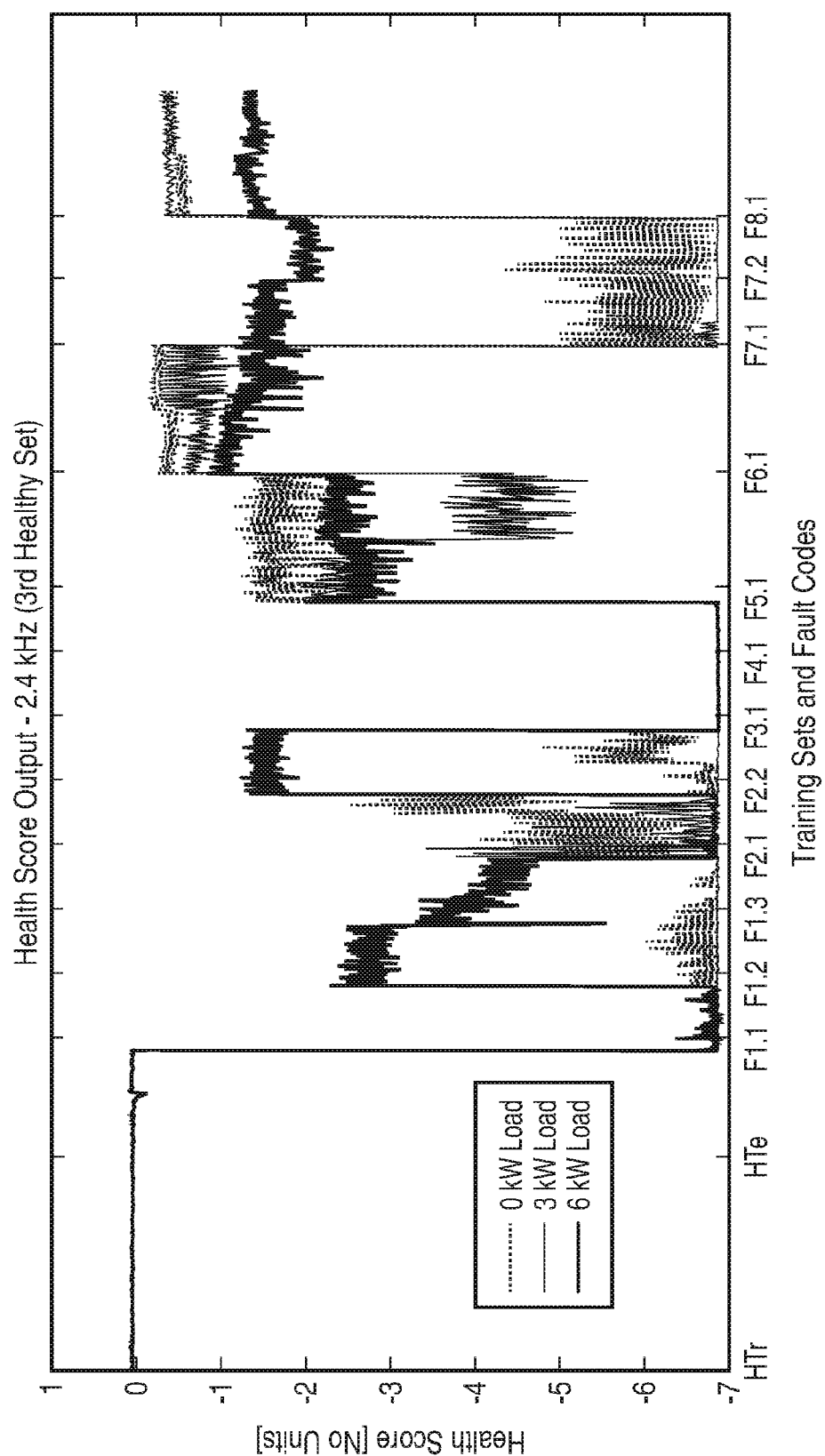
FIG. 11 illustrates how the health score changes when a number of different types of fault occur.

FIG. 11 shows the health indication determined by the module 8 for the test engine when a variety of changes were made to the test engine to simulate common engine faults. The fault codes on the x axis of FIG. 11 represent the various fault conditions as follows:

| Fault Code | Description | To Simulate |
|---|---|---|
| HTr | Training set of feature vectors used to train the classification model | Normal running conditions |

-continued

| Fault Code | Description | To Simulate |
|---|---|---|
| HTe | Baseline mapping in operation phase of model | Normal running conditions |
| 1.1 | Loose engine mount (Front Starboard) | Loose engine mounts |
| 1.2 | Loose engine mount (Front Port) | Loose engine mounts |
| 1.3 | Loose engine mount (Front Starboard + Front Port) | Loose engine mounts |
| 2.1 | Leaking Exhaust valve to Cylinder 3 | "Top end" cylinder leakage |
| 2.2 | Inlet valve tappet clearance Cylinder 3 | Push rod wear. |
| 3.1 | Fuel starvation to Cylinder 3 | Problems with fuel delivery and incomplete combustion |
| 4.1 | Big end bearing slack on cylinder 3 | Big end bearing wear |
| 5.1 | Piston ring gap increase (by filing) | Worn piston rings (achieved blow-by) |
| 6.1 | Piston - worn skirt on anti/thrust faces | Bore wear (attempt blow-by conditions. |
| 7.1 | Vary air filter blockage 45% | Air filter clogging (45%) |
| 7.2 | Vary air filter blockage 90% | Air filter clogging (90%) |
| 8.1 | Top ring-land increase gap | Top ring-land wear - leading to ring twist and/or ring flutter. |

As shown in FIG. 11, each type of fault results in a health score which is significantly different to the health score observed in the normal running conditions at HTe. It is clear that there is a good degree of separation between the faults and the healthy samples. While the particular pattern of variation in the health score is specific to the type of fault and also specific to the particular engine, the mere fact that there has been a change since the healthy operation can be detected by the diagnostic module 8 and used to flag that an engineer should investigate the cause of the fault. Over time, operators may be able to learn to ascribe particular health score signatures for particular types of fault, but this is not essential for successful operation of the system.

In the tests performed for gathering the data in FIG. 11, separate tests were carried out for three different loads on the test engine (0 kW, 3 kW, 6 kW). A separate classification model was provided for each level of load, with each classifier trained using only the data gathered for the corresponding load. As shown in FIG. 11, regardless of the load a change in health score relative to healthy operation can be observed. It is often the case that for a given fault, the health score becomes less negative as the engine load increases.

Figure 12:
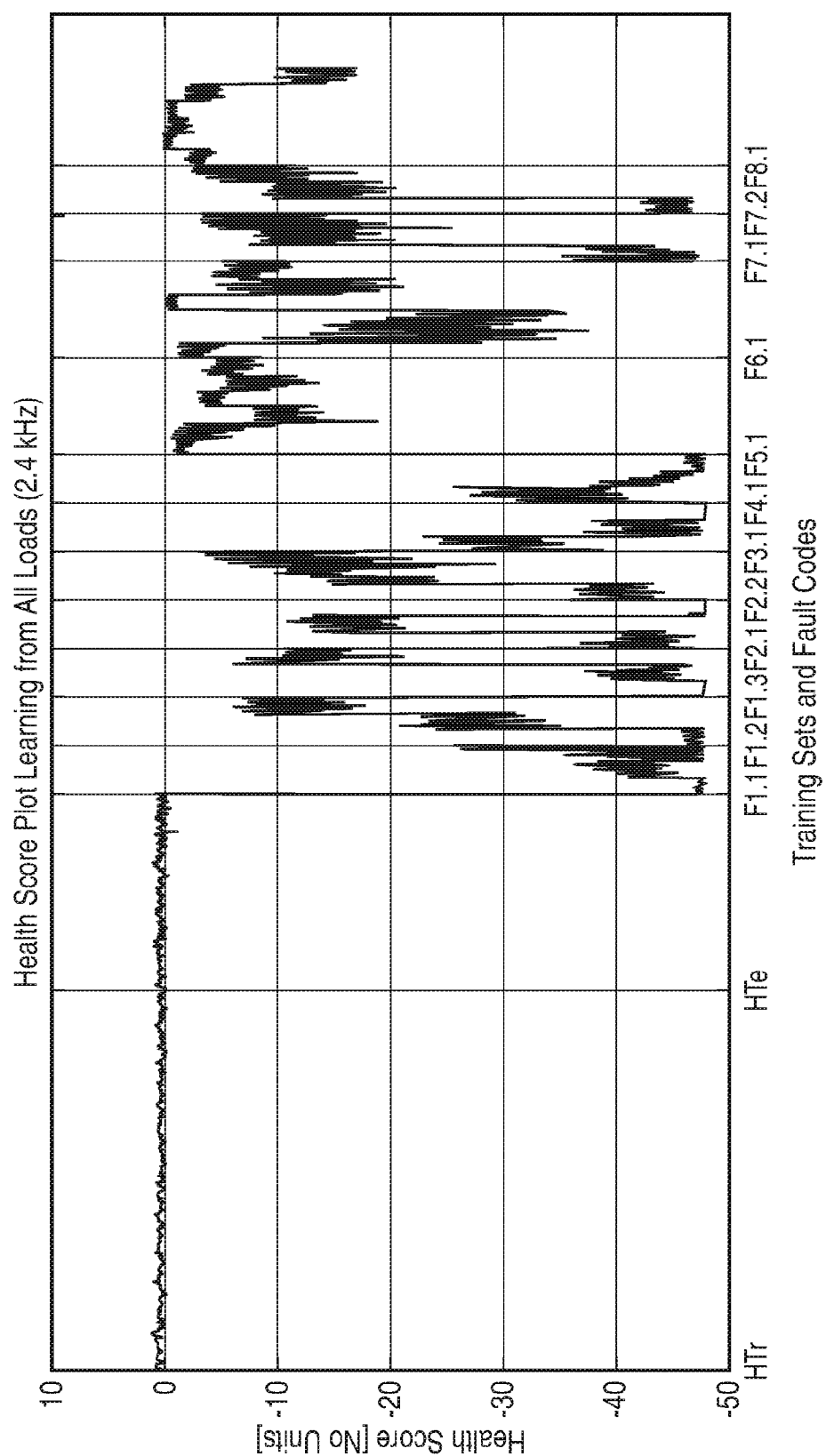
FIG. 12 shows how faults can be detected based on the health score even when the data for a number of different load conditions are combined in a single model.

A further test was carried out where the training sets of vibration data gathered from the test engine at all three different loads were used to train a single classification model, rather than having one classifier per load. FIG. 12 shows the health scores calculated by such a model when applied to the vibration data observed for each of the fault codes mentioned above. As shown in FIG. 12, the changes in health score relative to a healthy engine can still be observed even when the classifier does not distinguish between load. Hence, one classifier can learn from multiple loads and accurately detect faults regardless of the load, which is useful for real life shipping applications where the load is likely to change over time. The use of the WPT helps to make the model more robust against changes in load.

In one example, an engine health diagnostic apparatus for analysing health of a reciprocating internal combustion engine is provided, the apparatus comprising:
feature generation circuitry to process vibration sensor data received from a vibration sensor for sensing vibration at a component of said reciprocating internal combustion engine and generate a feature vector indicating a plurality of features of the vibration sensor data; and
processing circuitry to process the feature vector generated by the feature generation circuitry using a trained single-class classification model defined by model parameters characterising a feature space boundary, to generate an engine health indication providing a quantitative indication of deviation of the feature vector from the feature space boundary.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An engine health diagnostic apparatus for analysing health of an engine, the apparatus comprising:
feature generation circuitry to process vibration sensor data received from a vibration sensor for sensing vibration at a component of said engine and generate a feature vector indicating a plurality of features of the vibration sensor data;
processing circuitry to process the feature vector generated by the feature generation circuitry using a trained classification model defined by model parameters characterising a boundary of healthy operation learned from a training set of feature vectors corresponding to vibration sensor data captured during healthy operation of the engine, to generate an engine health indication providing a quantitative indication of deviation of the feature vector from the boundary of healthy operation, where the engine health indication is calculated based on distance between the feature vector and a boundary function representing the boundary of healthy operation as a hyperplane in N-dimensional hyperspace, where N is a number of features of the feature vector;
model storage circuitry to store the model parameters defining the trained classification model; and
training circuitry to update the model parameters stored by the model storage circuitry in dependence on said training set of feature vectors;
wherein the training circuitry is configured to determine the boundary of healthy operation which maximizes a margin between a predetermined fraction of outlying feature vectors of the training set and a remaining fraction of feature vectors of the training set, wherein the predetermined fraction and the remaining fraction are both non-zero.

2. The engine health diagnostic apparatus according to claim 1, wherein the plurality of features include at least one time domain feature of the vibration sensor data.

3. The engine health diagnostic apparatus according to claim 2, wherein said at least one time domain feature comprises at least one of: mean; variance or standard deviation; root mean square; kurtosis; skewness; and crest factor.

4. The engine health diagnostic apparatus according to claim 1, wherein the plurality of features include at least one frequency domain feature of the vibration sensor data.

5. The engine health diagnostic apparatus according to claim 4, wherein the feature generation circuitry is configured to apply a Wavelet Packet Transform to said vibration sensor data when generating said at least one frequency domain feature.

6. The engine health diagnostic apparatus according to claim 1, comprising scaling circuitry to generate a scaled feature vector by normalizing each feature of the feature vector relative to a common scale, wherein said processing circuitry is configured to process the scaled feature vector generated by the scaling circuitry using the trained classification model.

7. The engine health diagnostic apparatus according to claim 6, wherein the processing circuitry is configured to identify one or more selected features of the scaled feature vector having the largest or smallest scaled feature values on said common scale among the plurality of features of the scaled feature vector.

8. The engine health diagnostic apparatus according to claim 1, wherein the trained classification model comprises one of:
   a single-class classification model; and
   a single-class support vector machine.

9. The engine health diagnostic apparatus according to claim 1, comprising said vibration sensor, wherein the vibration sensor is retrofittable to said component of the engine.

10. The engine health diagnostic apparatus according to claim 1, comprising communication circuitry to communicate to a remote site at least one of:
    the engine health indication;
    a parameter derived from the engine health indication; and
    a differential engine health indication indicative of a difference between the engine health indication and a previously transmitted engine health indication.

11. The engine health diagnostic apparatus according to claim 1, wherein the engine is a reciprocating internal combustion engine, and the feature generation circuitry is configured to process a plurality of sets of vibration sensor data received from respective vibration sensors for sensing vibration at a plurality of cylinders of said reciprocating internal combustion engine, and to generate a plurality of feature vectors each corresponding to one of the cylinders; and
    the processing circuitry is configured to perform one of:
       processing each feature vector generated by the feature generation circuitry using the trained classification model to generate a plurality of engine health indications each corresponding to a respective cylinder; and
       processing each feature vector generated by the feature generation circuitry using a respective trained classification model for the corresponding cylinder, each trained classification model defined by a respective set of model parameters characterising a boundary of healthy operation learned from a training set of feature vectors corresponding to vibration sensor data captured for the corresponding cylinder during healthy operation of the reciprocating internal combustion engine.

12. A system comprising:
    an engine;
    a vibration sensor configured to sense vibration at a corresponding component of the engine; and
    the engine health diagnostic apparatus according to claim 1.

13. The engine health diagnostic apparatus according to claim 1, wherein the engine is a reciprocating internal combustion engine.

14. An engine health diagnostic apparatus for analysing health of an engine, the apparatus comprising:
    feature generation circuitry to process vibration sensor data received from a vibration sensor for sensing vibration at a component of said engine and generate a feature vector indicating a plurality of features of the vibration sensor data; and
    processing circuitry to process the feature vector generated by the feature generation circuitry using a trained classification model defined by model parameters characterising a boundary of healthy operation learned from a training set of feature vectors corresponding to vibration sensor data captured during healthy operation of the engine, to generate an engine health indication providing a quantitative indication of deviation of the feature vector from the boundary of healthy operation;
    wherein the plurality of features include at least one peak vibration timing feature indicative of a timing of a peak in the vibration sensor data relative to an operating cycle of said engine.

15. The engine health diagnostic apparatus according to claim 14, wherein the feature generation circuitry is configured to identify said at least one peak vibration timing feature from the vibration sensor data and crankshaft angle sensor data indicative of an angular position of a crankshaft of the engine.

16. The engine health diagnostic apparatus according to claim 14, comprising: model storage circuitry to store the model parameters defining the trained classification model; and training circuitry to update the model parameters stored by the model storage circuitry in dependence on said training set of feature vectors.

17. The engine health diagnostic apparatus according to claim 16, wherein the training circuitry is configured to determine the boundary of healthy operation which maximises a margin between a predetermined fraction of outlying feature vectors of the training set and a remaining fraction of feature vectors of the training set, wherein the predetermined fraction and the remaining fraction are both non-zero.

18. An engine health diagnostic method for analysing health of an engine, the method comprising:
    capturing vibration sensor data using a vibration sensor fitted to sense vibration at a component of said engine;
    processing the vibration sensor data to generate a feature vector indicating a plurality of features of the vibration sensor data; and
    processing the feature vector using a trained classification model defined by model parameters characterising a boundary of healthy operation learned from a training set of feature vectors corresponding to vibration sensor data captured during healthy operation of the engine, to generate an engine health indication providing a quantitative indication of deviation of the feature vector from the boundary of healthy operation, where the engine health indication is calculated based on distance between the feature vector and a boundary function representing the boundary of healthy operation as a hyperplane in N-dimensional hyperspace, where N is a number of features of the feature vector;

wherein the trained classification model is defined by stored model parameters updated by training in dependence on said training set of feature vectors, the training comprising determining the boundary of healthy operation which maximizes a margin between a predetermined fraction of outlying feature vectors of the training set and a remaining fraction of feature vectors of the training set, wherein the predetermined fraction and the remaining fraction are both non-zero.

19. A non-transitory, computer-readable storage medium storing a computer program comprising instructions to control a data processing apparatus to perform the method of claim 18.

* * * * *